United States Patent
Goodrich et al.

(10) Patent No.: US 6,516,326 B1
(45) Date of Patent: Feb. 4, 2003

(54) SYSTEM AND METHOD FOR INTEGRATING ELECTRICAL POWER GRID AND RELATED DATA FROM VARIOUS PROPRIETARY RAW DATA FORMATS INTO A SINGLE MAINTAINABLE ELECTRICALLY CONNECTED DATABASE

(75) Inventors: Margaret E Goodrich, Malakoff, TX (US); Jeffrey S Peterson, Allen, TX (US); David B McClendon, Arlington, TX (US); Kevin B Perry, Benton, AR (US)

(73) Assignee: Stone and Webster Consultants, Inc., Baton Rouge, LA (US)

( * ) Notice: Subject to any disclaimer, the term of this patent is extended or adjusted under 35 U.S.C. 154(b) by 246 days.

(21) Appl. No.: 09/702,150

(22) Filed: Oct. 30, 2000

(51) Int. Cl.⁷ ............................................. G06F 17/30
(52) U.S. Cl. ................................. 707/104.1; 707/102
(58) Field of Search ............................. 707/104.1, 102

(56) References Cited

U.S. PATENT DOCUMENTS

| | | | |
|---|---|---|---|
| 4,709,339 A | * 11/1987 | Fernandes | 324/127 |
| 4,926,444 A | * 5/1990 | Hamilton et al. | 329/300 |
| 5,604,892 A | * 2/1997 | Nuttall et al. | 703/18 |
| 6,327,541 B1 | * 12/2001 | Pitchford et al. | 702/62 |
| 6,331,762 B1 | * 12/2001 | Bertness | 320/134 |

* cited by examiner

Primary Examiner—Wayne Amsbury
Assistant Examiner—Sana Al-hashemi
(74) Attorney, Agent, or Firm—Kean, Miller, Hawthorne, D'Armond, McCowan & Jarman, L.L.P.

(57) ABSTRACT

An improved system and method of automating the integration of different Energy Management Systems (EMS) electrical power grid databases into a single power grid database. This method imports proprietary EMS raw data from various vendors' formats into a Common Information Model (CIM) with specific connectivity extensions and produces an electrically connected power systems database that can be viewed or edited. Direct network topology conversion from one EMS vendor data format to another is also supported. Two generated databases can then be selectively integrated and maintained to produce a fully populated network topology without disclosing EMS vendor specific proprietary information. The new, possibly larger, database can then be added to yet another database that is similarly processed.

12 Claims, 38 Drawing Sheets

Create CSV Schema

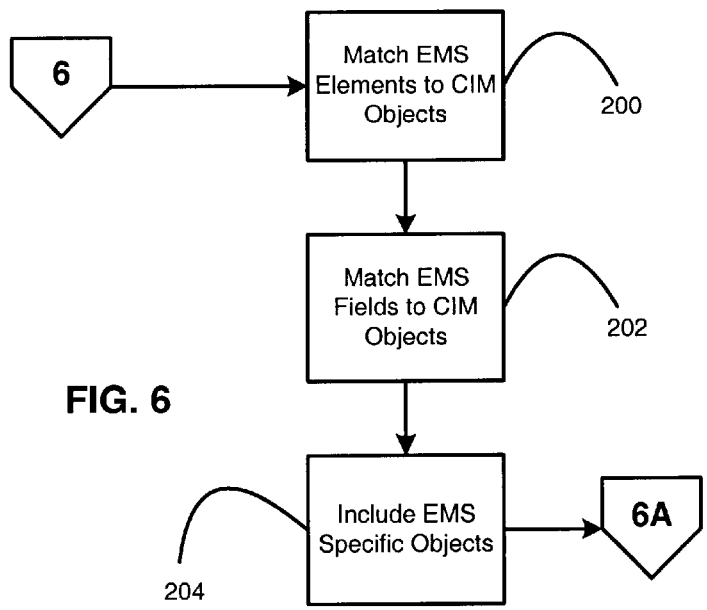

FIG. 6

EMS Vendor Specifc Data Schema Example

```
[ems_company.csv]
ColumnNameHeader=TRUE
CharacterSet=ANSI
Format=CSVDelimited
Col1=fk_Index LONG
Col2=CompanyRecord SHORT
Col3=CompanyType SHORT
Col4=CompanyName TEXT
Col5=CoExchangeControl TEXT
Col6=CoScheduledMWExchge DOUBLE
Col7=CoScheduledMVARExchange DOUBLE
Col8=CoExchangeTolerance DOUBLE
Col9=CoSlackGeneratorRecordNumber SHORT
```

FIG. 7

Mimic EMS Hierarchy

FIG. 8

```
ParseTable e_NetKeywords[] =         // File N_XXX.RAW
{  // Table Name  , Record Type  , Fields,           ,Level, Model { "e_co"       , "CO"         , N_company_info    , 0, 1 },
   { "e_dv"       , "DV"         , N_division_info   , 1, 1 },
   { "e_st"       , "ST"         , N_station_info    , 2, 1 },
   { "e_kv"       , "KV"         , N_kvlevel_info    , 3, 1 },
   { "e_un"       , "UN"         , N_unit_info       , 4, 1 },
   { "e_uncap"    , "UNCAP"      , N_unitcap_info    , 5, 1 },
   { "e_aux"      , "AUX"        , N_auxload_info    , 4, 1 },
   { "e_ld"       , "LD"         , N_load_info       , 4, 1 },
             .              .             .                .
             .              .             .                .
             .              .             .                .
}
```

FIG. 9

CIM Connectivity Extension

PsyPsrTypes

| PsrTypeIndex | PsrName | MaxPsrIndex | PrevPsrType |
|---|---|---|---|
| 1 | Division | | 77 |
| 2 | Section | | |
| 3 | LoadArea | | 6 |
| 4 | Bay | | |
| 5 | Substation | | 1 |
| 6 | VoltageControlZone | | 5 |
| 7 | PowerCutZone | | |
| 8 | ControlHouseEquipment | | |
| 9 | HeatExchanger | | |
| 10 | ConductingEquipment | | |
| 11 | Ground | | 53 |
| 12 | EnergyConsumer | | 25 |
| 13 | FeederLoad | | |
| 14 | CustomerMeter | | |
| 15 | InductionMotorLoad | | |
| 16 | StationSupply | | |
| 17 | RectifierInverter | | |
| 18 | Switch | | |
| 19 | Breaker | | 12 |
| 20 | Disconnector | | 21 |
| 21 | Fuse | | |
| 22 | Jumper | | |
| 23 | LoadBreakSwitch | | |
| 24 | Conductor | | 11 |
| 25 | BusBarSection | | 3 |
| 26 | ACLineSegment | | 47 |
| . | . | . | . |

FIG. 12

CIM Connectivity Extension

PsyTerminalTypes

| PK_PsyTerminalTypes | TerminalType |
|---|---|
| 1 | GeneratingUnit |
| 2 | Transformer_Primary |
| 3 | Transformer_Secondary |
| 4 | Transformer_Tertiary |
| 5 | CapacitorBank |
| 6 | ReactorBank |
| 7 | EnergyConsumer |
| 8 | RectifierInverter_AC |
| 9 | RectifierInverter_DC |
| 10 | StaticVarCompensator |
| 11 | Switch_From |
| 12 | Switch_To |
| 13 | ACLineSegment_From |
| 14 | ACLineSegment_To |
| 15 | DCLineSegment_From |
| 16 | DCLineSegment_To |
| 17 | Transformer_PhaseShifter |
| 18 | Conductor_From |
| 19 | Conductor_To |
| 20 | Ground |
| 21 | BusBarSection |
| . | . |
| . | . |
| . | . |

FIG. 13

CIM Connectivity Extension

PsyPowerSystemResourcePowerSystemResource

| PK_PsyPowerSystemResourcePowerSystemResource | FK_MemberOf | FK_Has |
|---|---|---|
| 1 | 1 | 14 |
| 2 | 2 | 15 |
| 3 | 3 | 16 |
| 4 | 4 | 17 |
| 5 | 5 | 18 |
| 6 | 6 | 19 |
| 7 | 7 | 20 |
| 8 | 8 | 21 |
| 9 | 9 | 22 |
| 10 | 10 | 23 |
| . | . | . |
| . | . | . |
| . | . | . |

FIG. 14

CIM Connectivity Extension

PsySwitchTypes

| PsrTypeName | SwitchType | Company |
|---|---|---|
| Breaker | 69 | BPA |
| Breaker | ABD | BPA |
| Breaker | ACB | SPP |
| Breaker | BBS | SPP |
| Breaker | BPD | BPA |
| Breaker | BRKR | MGE |
| Breaker | BUS | SPP |
| Breaker | CB | ALL |
| Breaker | CBTYP | ALL |
| Switch | CKTSW | MGE |
| Switch | CS | SPP |
| Switch | CSW | SPP |
| Breaker | DCS | BPA |
| Disconnector | DIS | MGE |
| Disconnector | DISC | DUKE/SPP |
| . | . | . |

FIG. 15

CIM Connectivity Extension

PsyRefConvert

| PK_PsyRefCnvt | ref1 | ref2 | ref3 | SuccessFlg | LastUsed |
|---|---|---|---|---|---|
| 1 | SrceFrmt | ESC | ESC-ODMS v1.5.01 | 1 | 9/21/00 4:31:14 PM |
| ⋮ | ⋮ | ⋮ | ⋮ | ⋮ | ⋮ |

FIG. 16

CIMBusBarSection

| BusBarSectNo | CoIndx | SubstnPsrIndx | VoltPsrIndx | ConnNodeIndx | PsrIndx | PsrTypIndx | ... |
|---|---|---|---|---|---|---|---|
| 1 | 2 | 22 | 77 | 1 | 104 | 25 | ... |
| 2 | 2 | 22 | 77 | 2 | 105 | 25 | ... |
| 3 | 2 | 22 | 77 | 3 | 106 | 25 | ... |
| 4 | 2 | 22 | 77 | 4 | 107 | 25 | ... |
| 5 | 2 | 22 | 77 | 5 | 108 | 25 | ... |
| 6 | 2 | 22 | 77 | 6 | 109 | 25 | ... |
| ⋮ | ⋮ | ⋮ | ⋮ | ⋮ | ⋮ | ⋮ | ⋮ |

FIG. 17

BusBarSection

| PK_BusBarSect | BaseVolt | BusBarSect Type | HiVoltLim | LowVoltLim | ... |
|---|---|---|---|---|---|
| 104 | 345 | | 345 | 345 | ... |
| 105 | 345 | | 345 | 345 | ... |
| 106 | 345 | | 345 | 345 | ... |
| ⋮ | ⋮ | ⋮ | ⋮ | ⋮ | ⋮ |

FIG. 18

CIM Connectivity Extension

CIMConnectivity

| ConnNo | ConnName | ConnDesc | VltPsrIndx | SubPsrIndx | fk_kv | fk_nd | Type | CoIndx |
|---|---|---|---|---|---|---|---|---|
| 1 | HOWEINTTP | HOWEINTTP$371 | 2509 | 27 | HOWEINTTP$69$1 | 371$HOWEINP$0 | BusBar | 1 |
| 2 | 112GORE4 | 112GORE4$1851 | 4063 | 1480 | 112GOR$138$1454 | 1851$112GORE4 | BusBar | 5 |
| 3 | 17TH 4 | 17TH 4$2492 | 4859 | 2276 | 17TH$138$2250 | 2492$17TH 4 | BusBar | 11 |
| 4 | 19TH ST4 | 19TH ST4$2069 | 4334 | 1751 | 19TH$138$1725 | 2069$19TH ST4 | BusBar | 7 |
| ... | | | | | | | | |

FIG. 19

Database Table Relationships Example

Display Connectivity Nodes

Insert a New Transformer Winding

| CHOOSE A BASE KV LEVEL FOR THE NEW TRANSFORMERWINDING | | |
|---|---|---|
| powersystemresource | Substation | BaseKV |
| ▷ 138 | 138$DOWNTOWN | 138 |
| 14 | 14$DOWNTOWN | 13.8 |
| 22 | 345$DOWNTOWN | 22 |

[ OK ]   [ Cancel ]

FIG. 28

— Transformer Winding Designation — o  Primary Transformer Winding      [ OK ]
o  Secondary Transformer Winding
o  Tertiary Transformer Winding     [ Cancel ]

FIG. 29

CIM Database Integration - Pass 2

Substation Connectivity Check

Terminal Assignment Table

| Device | Terminals |
|---|---|
| AC Line Segments | 2 |
| Breakers | 2 |
| Bus Bar Sections | 1 |
| Capacitor Banks | 1 or 2 |
| Conductors | 1 |
| DC Line Segments | 2 |
| Disconnectors | 2 |
| Energy Consumers | 1 |
| Fuses | 2 |
| Jumpers | 2 |
| Load Break Switches | 2 |
| Phase Shifters | 1 |
| Reactor Banks | 1 or 2 |
| Rectifier Inverters | 3 |
| Static Var Compensators | 1 |
| Switches | 2 |
| Synchronous Machines | 1 |
| Transformer Windings | 1 |
| Grounds | 1 |
| . . . | . . . |

FIG. 38

Disconnected Device Reconciliation

| ODMS Model Merge --- Disconnected Device Reconciliation ||
|---|---|
| [Companies with Disconnected Devices] --> ... B <UNKNOWN>... <UNKNOWN>...<ACLineSegment> (LN$1$13869$NRTH) ... [XLine=13869] | [D:\AREA1\AREA1.MDB] COMPANY --> B Substation CECIL ..138 [ACLineSegment]] ... (LN$1$13869$NRTH) ... [XLine=13869] |
| ⊞-- A<br>⊟-- B<br>  ⊟ < UNKNOWN ><br>    ⊟ < UNKNOWN ><br>      ⊟ [ ACLineSegment ]<br>        -- (LN$1$13869$NRTH) [XLine=13869] | ⊟-- A<br>  ⊟ < CECIL ><br>    ⊟ 138 [138]<br>      ⊟ [ ACLineSegment ]<br>        -- (LN$1$13869$NRTH) [XLine=13869]<br>        ⊞-- $47$138$CECIL$1 From [A - CECIL]<br>        ⊞-- $41$138$RICH$1 To [A-RICH] |
| [D:\AREA2\AREA2.MDB] | [D:\AREA1\AREA1.MDB] |
| ⊟-- A<br>  ⊟ < CECIL ><br>    ⊟ 138 [138]<br>      ⊞ [ ACLineSegment ] | |

FIG. 41

Export EMS Resource Cross-Reference Table

| CoName | DivName | PsyEmsName | PsyPSRType | Srce_PsyEMSName | PsyGUID TargetName |
|--------|---------|------------|------------|-----------------|--------------------|
| ABC | Alpha | CB | Breaker | CB | CB000001 |
| ABC | Alpha | CB | Breaker | CB | CB000002 |
| ABC | Alpha | CB | Breaker | CB | CB000003 |
| ⋮ | ⋮ | ⋮ | ⋮ | ⋮ | ⋮ |

FIG. 45

SYSTEM AND METHOD FOR INTEGRATING ELECTRICAL POWER GRID AND RELATED DATA FROM VARIOUS PROPRIETARY RAW DATA FORMATS INTO A SINGLE MAINTAINABLE ELECTRICALLY CONNECTED DATABASE

BACKGROUND OF THE INVENTION

1. Technical Field of the Invention

The present invention relates to the sending and receiving of electrical power data between different Energy Management Systems (EMS). Currently, there are about a dozen large EMS vendors and many smaller vendors. Each EMS vendor data format is inherently incompatible with any other EMS data format. More particularly, the present invention relates to an automated system and method to integrate, convert and maintain power grid information from various EMS vendors data formats into a single electrically connected database.

2. Description of the Prior Art

The electrical power generation industry has long enjoyed a regulated monopoly over the generation and transmission of electrical power and can influence service, policy and pricing to the consumers within their specific geographical area. Electrical power transfers are based on detailed network models encompassing only a specific geographical area with significantly less detailed network models of the surrounding area. Transferring power outside of the limited geographical area containing detailed electrical network models is problematical simply because of the lack of a unified network model. Consequently, such electrical power transfers are very limited in their range and frequency.

As a result of recent changes in Federal and State regulations, electric utilities are transitioning to a competitive market. The impact of competition is driving the market to seek out low cost energy producers and create a larger commodity market for electric power. Consequently, the Federal Energy Regulatory Commission (FERC) has mandated change through the issuance of Orders 888 and 889 (dated Apr. 24, 1996) and Order 2000 (dated March 2000) to encourage wholesale competition. Order 888 requires utilities to provide all power producers open access to the Transmission Grid and Order 889 requires utilities to establish electronic systems to share information about available transmission capacity. Order 2000 requires the creation of a Market-Reliability System to be implemented to ensure the reliability of the grid and provide non-discriminatory transmission access by 2005.

Accurately calculating the capacity of the transmission system and to efficiently manage congestion on the system requires that much larger detailed models of the network must be constructed that spans entire regions rather than one utility area. These models are the foundation upon which grid facility status and changes are monitored, risks managed and power transfers scheduled and routed. Without this fundamental model information (which does not exist), grid reliability and security is at risk and dependable market trading is impaired. Keeping models up to date will become an even more demanding task when the NERC policy on exchange of real-time network data is deployed on Sep. 1, 2001. Compliance with this policy will require automated model updating processes.

The operation (generation, transmission and distribution) of electrical power generation facilities employ a proprietary Energy Management System (EMS) that is tightly coupled to a particular operating system, computer manufacturer and a specific version of the associated application program. Examples of EMS vendors include the following: GE/Harris, ESCA, Siemens, Open Systems International (OSI), TeleGyr and Power Technologies (PSS/O). The nature of the various EMS vendors is to closely guard their proprietary secrets of operation, which includes the format of their data. The present state of the art is such that sending or receiving electrical power from different EMS vendors is difficult at best to perform without significant advance notice. Minimal transactions between different EMS formats are typical due the time required to translate the data formats from one EMS vendor's :format to another.

The lack of a detailed power system network topology when spanning three or more EMS vendor data formats can result in electrical power scheduling failures. Consider the network topology for these three bordering companies: company A, company B, and company C. Company A has topological connections only to company B. Company B has topological connections only to company C. When company A schedules a power transfer to company C, company B does not know about the power transfer although the actual wires are in the company B area. The scheduling error occurs when company B attempts to send power through the same lines that are already in use by companies A and C. This case is rare, however, it has been known to occur and is the direct result of not having a single model that encompasses all three of the companies areas.

Generally, at least 24 hours advance notice are required by any given EMS vendor to send or receive electrical power to a different EMS due to the problems associated with dynamically balancing the generation capacity and demand load for a given time interval starting from different data formats. This time period can be significant in the case of an unpredictable emergency caused by natural phenomena such as a hurricane or unusually high temperatures during the summer months.

The problem of sharing data between different EMS vendors in a timely fashion has been partly addressed in the development of a standard exchange format known as the Common Information Model (CIM) sponsored by the Electrical Power Research Institute (EPRI). The CIM is an abstract model that represents all of the major objects typically contained in an EMS information model. A typical EMS data format will contain power system resources such as: companies, divisions, substations, transformers, generators, busbars, A/C lines, D/C Lines, capacitor banks, reactor banks, energy consumers (loads), breakers, switches, conductors, connectivity nodes, fuses, jumpers and grounds at various voltage levels.

The current CIM was based on U.S. Pat. No. 5,604,982 to Nuttall et al. Feb. 18, 1997. This patent relies on a single source information model that separates the data format and relationships through the use of surrogate keys as described on page 11. Changing a surrogate key would make all objects associated with the key change. The primary concern was to allow various programs access to a single data source. The primary concern here is with network models and building a single network model database from raw data of various formats. There is a lack of instruction on how to convert various data formats into the CIM format and further a lack of instruction on how to merge data from multiple CIM compliant databases. Nuttall et al. does teach how to construct a discrete hierarchical relationship based on physical quantification. However, these relationships have inherent limitations that must be expanded in order to produce and maintain composite network models.

Significant effort is required to convert the various EMS data formats into the CIM due in part because of the different terminology used to describe the same physical equipment. A database capable of recalling specific power systems equipment requires significant programming effort simply because of the vast amount of equipment involved and the numerous types of equipment to be classified. The various EMS's differ in their internal data format and the relationships between the various elements or equipment. The actual migration of raw EMS extracted data into the CIM format requires computer programming skills and specific electrical power modeling knowledge.

When an EMS vendor converts their internal data format to the CIM format, the geographically bordering EMS must also convert their data to the CIM format. Electrical power transfers are generally limited to about 1000 miles due to the degradation of electrical flow though the wires. This distance could span multiple EMS data formats. Typically, power transfers occur only on bordering EMS's and rarely three or more different EMS vendor data formats are involved in any given electrical power flow transaction.

The data contained in the CIM format from two different EMS data types must be integrated into a single power grid model to properly analyze a power transfer request. The process of integrating two or more power grid databases is not included in the CIM specification. This currently requires extensive manual effort to insure that the electrical connections are correct and properly electrically terminated. None of the current EMS vendors have converted their proprietary power systems data to the CIM format.

One of the primary manual tasks involved in the power grid consolidation is resolving the naming of substations and the various power systems equipment types such that the names are unique. For example, most EMS network topology models in any given area have a substation named "airport". A given EMS format may require that all substation names are unique and typically the foreign substation is renamed. Yet another instance is when power utility companies merge with bordering companies having the same or different EMS data formats. Again, unique naming of the power systems equipment presents the problem even when the newly acquired utility has the same EMS format. Another example of naming convention problems is when one EMS vendor allows duplicate names for specific power systems equipment and this is an error condition in the foreign EMS vendors' system. Additionally, the character length of the names for the various power systems equipment varies from vendor to vendor. An EMS vendor type may only allow eight characters for the equipment and another EMS vendor may allow up to 16 characters or more for the same equipment. Consolidating the 16 or more character names into an eight-character field presents additional naming problems. The naming conventions, given the number of substations and related power system resources, are of great concern when these number in the thousands and tens of thousands.

Tie Lines are inter-substation transmission lines that typically connect between two different EMS data formats. These are used to transmit or receive electrical power between different companies. Transformers are similarly used between companies when the source and target voltage levels are different. The target locations are considered outside of the source substation's network. Modeling is generally sparse in terms of the power system equipment detail for the target network topology due to the limited information provided by the target company and the proprietary nature of the EMS in the target substation.

Another manual process involves extracting only a portion of the foreign network topology due to company ownership boundaries. This is labor intensive again due to the requirement that the resulting network topology must have proper connectivity. One or more alternating or direct current Tie Lines connects between the source and target area substations. The target area substation also has connections to other substations in the target company and perhaps other companies such that severing the connections during a merging process causes non-terminated nodes that must be resolved. Typically, several manual iterations of this process are required to properly electrically terminate the target substation's externally linked equipment. This problem is further compounded by the modeling efforts of the source substation's sparse representation of the target substation's network. Integrating the source and target substations requires that the source substation must first remove the sparse representation of the target substation before adding the more detailed representation of the target substation to obtain the complete network topology.

The actual electrical power grids are represented in a wide variety of data formats. The planning and network topology models show increasing levels of power grid detail. EMS vendors do not provide the same level of detail for all of the power systems related equipment. The manual effort required to generate a fully populated network topology is monumental when there are no starting references other than the application programs controlling the power flow.

The graphic representation of a substation is referred to as a One-Line. The One-Line diagram contains industry standard symbols that represent specific devices commonly found in a substation. These manually or automatically generated diagrams are currently used for source material when modeling external power systems equipment. Another method currently used is to manually text edit one or more specific EMS raw data file(s) from the target substation(s) into a corresponding text formatted file to join the data. These manual processes are again duplicated when new power systems equipment is added or removed to update the current representation of the physical hardware. Obviously, these methods are time consuming and prone to human error. Indeed, this virtual "Tower of Babylon" represented in the various EMS formats is a major contributing factor for the government intervention.

Based on the aforementioned problems described above, the technical problem exists to:

1) Find an automated method to integrate power system data from multiple EMS vendor's data formats into a single power systems database that is properly electrically connected, easily updateable and maintains EMS vendor specific data format confidentiality;

2) Find a method to automatically convert from one EMS vendor's data format to another EMS vendor's data format; and 3) Facilitates compliance with the Federal Energy Regulatory Commission (FERC) orders 888, 889 and 2000.

SUMMARY OF THE INVENTION

The present invention has been reduced to practice for several EMS vendor's data formats using programming languages from Microsoft Visual C++ and Visual Basic. Database operations use Microsoft Access format and optionally any Open Database Connectivity (ODBC) or Data Access Objects (DAO) may be used. Other platforms and development software may also be used. The present invention is directed to a process which:

(a) Imports Energy Management System vendor specific raw data and converts the data into a Common Information Model (CIM) database;
(b) Adds various connectivity extensions to the CIM database;
(c) Produces an electrically connected CIM power systems database;
(d) Automatically integrates two or more CIM power systems databases;
(e) Detects and facilitates user resolution of possibly disconnected devices encountered when integrating the power grid databases;
(f) Checks equipment electrical connectivity and distinctively enumerates invalid connections;
(g) Facilitates updating the CIM power grid database through a graphical user interface to display and edit power systems equipment; and
(h) Exports a CIM database into a different EMS vendor data format.

The present invention has several advantages over the prior art of manually integrating one line diagrams or the text based editing of raw data. One advantage is in the reduction or elimination of human errors introduced in the process of text editing or manually developing the data using One-Line diagrams.

Another advantage is the reduction or elimination of power scheduling errors caused by the lack of a single network model that encompasses the entire area in which the scheduled power transfers occur.

Another advantage of the present invention is the speed of the automated process that converts the various EMS data formats into a Common Information Model. The computer processing time required in converting a vendor specific EMS raw data set into the CIM data format is significantly less than manual methods once the vender specific EMS conversion "filter" to the CIM has been developed.

Yet another advantage of the present invention is the ease of updating of the power systems equipment representation using a graphical user interface with various hierarchical views capable of downward tree expansion.

Yet another advantage of the present invention is the resolution of unique naming convention problems encountered when integrating foreign electrical network topologies through automatic cross-reference generation of inter-substation Tie Lines and related power systems equipment.

Yet another advantage of the present invention is the automatic conversion of one EMS vendors power system data format into another EMS vendors format while maintaining confidentiality of EMS specific data formats.

Still another advantage of the present invention is the automated integration of multiple EMS vendors' power systems databases into a single electrically connected database.

It is therefore an object of the present invention to provide a method and apparatus that inputs the raw data from any EMS data format and automatically converts it into the CIM format with specific integration extensions.

It is another object of the invention to provide a method and apparatus to automatically convert the CIM's power systems data format to another EMS vendor's power systems data format.

It is another object of the invention to provide a method and apparatus to allow the updating of the power systems equipment in the database for maintenance and simulation studies.

It is yet another object of the present invention to provide a method and apparatus to automatically integrate two power systems databases into a single electrically connected database. This process can be infinitely repeated such that all of the electrical power can be contained in a single database containing the entire network topology and associated CIM data.

It is yet another object of the present invention to provide a method and apparatus to detect and provide correction for disconnected devices as a result of integrating two power systems databases.

It is still another object of the invention to provide a method of documenting the physical power systems equipment. Because the original data is extracted from a running EMS application, the results of the imported data can be used to visually verify the in-house representation of the physical power system equipment present in the EMS system.

The foregoing disclosure and the content of the drawings are merely illustrative of the principals of this invention and are not to be interpreted in a limiting sense. Accordingly, the CIM is subdivided into several packages with the current focus on the class relationships found in the Core, Topology, and Wires packages. One skilled in the art would find that all of the remaining packages and future CIM extensions may be similarly processed. Additionally, non-proprietary data formats from other industries conforming to common information model architecture could be similarly processed. Still further objects and advantages will become apparent from a consideration of the ensuing description of a preferred embodiment of the invention and accompanying drawings wherein like reference numbers represent like parts of the invention. The present invention is best understood when correlating the table extensions as follows:

1) A "CIM" prefix indicates that it is the "Base" or work table containing additional information and that extraneous information is removed when the table is loaded in to the table of the same name, and
2) A "Psy" prefix indicates that the table was created and was not directly derived from the CIM specification.

BRIEF DESCRIPTION OF THE DRAWINGS

FIG. 6 is a flow chart that describes the process of creating comma-separated value (CSV) schema of the various data extracted from the EMS raw data and documentation of the present invention.

FIG. 7 is a detailed example of a vendor specific data format for the database schema in the preferred embodiment of the present invention.

FIG. 8 is a flow chart of the steps used to extract raw data during import when the raw data input contains a hierarchy.

FIG. 9 is a detailed code fragment example of the internal structure used to emulate hierarchical data formats in the preferred embodiment of the present invention.

FIG. 12 is an example table of an internal database CIM extension used to insure equipment connectivity in the preferred embodiment of the present invention.

FIG. 13 is another example table of an internal database CIM extension used to insure equipment connectivity in the preferred embodiment of the present invention.

FIG. 14 is another example table of an internal database CIM extension used to insure equipment connectivity in the preferred embodiment of the present invention.

FIG. 15 is another example table of an internal database CIM extension used to insure equipment connectivity in the preferred embodiment of the present invention.

FIG. 16 is yet another example table of an internal database CIM extension used to insure equipment connectivity in the preferred embodiment of the present invention.

FIG. 17 is an example table of an internal database worktable used in the Import process in the preferred embodiment of the present invention.

FIG. 18 is an example table of a final CIM format used in the Import process in the preferred embodiment of the present invention.

FIG. 19 is an example table of a connectivity database CIM extension used in the Import process in the preferred embodiment of the present invention.

FIG. 28 is an example representation of inserting a transformer device into the substation of the graphical user interface in the preferred embodiment of the present invention.

FIG. 29 is a continuation of FIG. 28 which queries equipment detail for a transformer device in the graphical user interface in the preferred embodiment of the present invention.

FIG. 38 is an example table used in connectivity checking for the number of terminals for each device in a substation in the preferred embodiment of the present invention.

FIG. 41 is an example of the graphical user interface for resolving disconnected equipment as a result of a database integration (Model Merge) in the preferred embodiment of the present invention.

FIG. 45 is an example of the Energy Management System (EMS) resource cross-reference table used during the Export process in the preferred embodiment of the present invention.

DETAILED DESCRIPTION OF THE INVENTION

Figure 1:
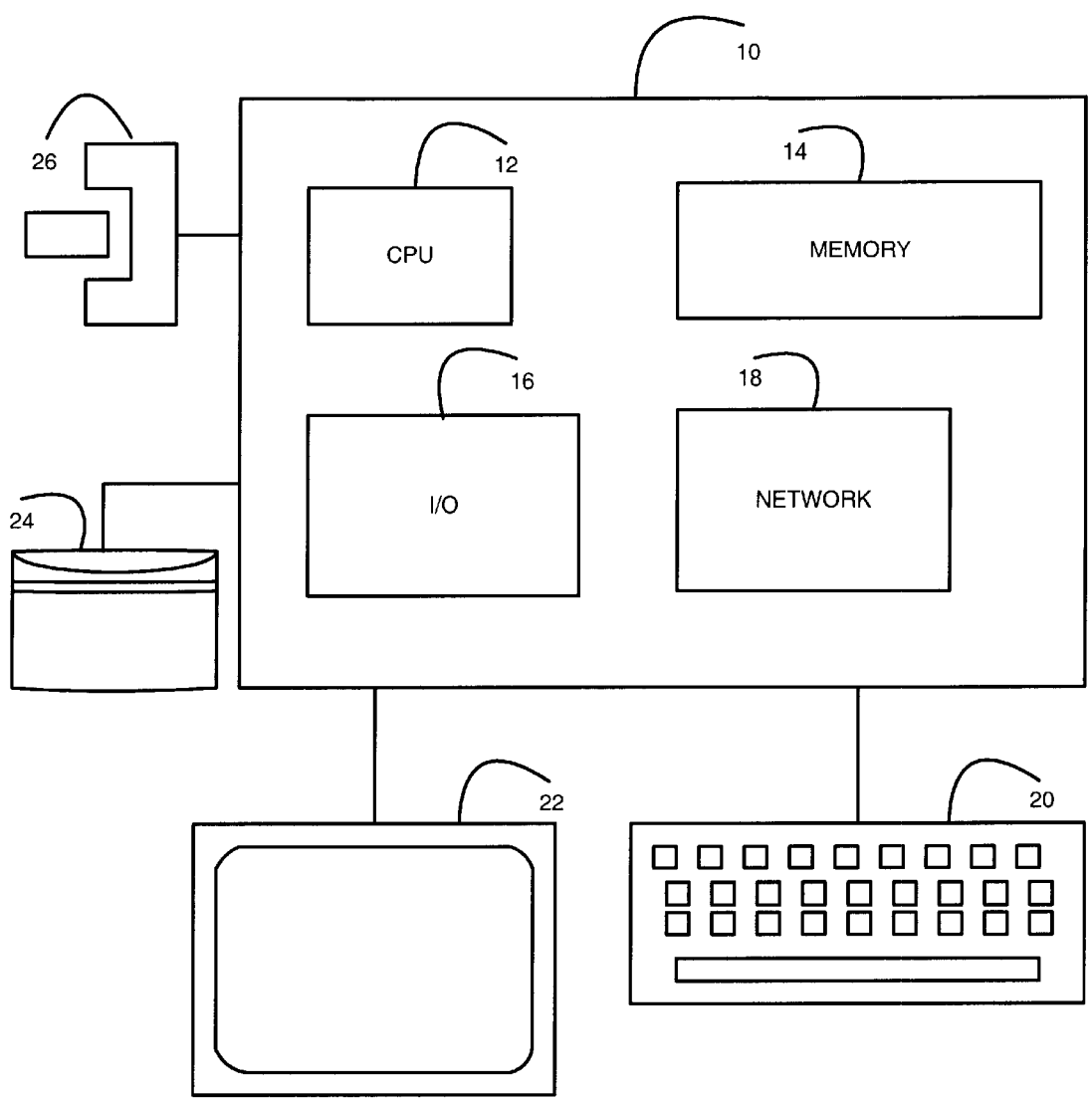
FIG. 1 is a block diagram of selected internal components of a personal computer, upon which the present invention can be practiced.

In FIG. 1, there is shown a block diagram of the internal components of a personal computer 10 upon which the present invention can be practiced. A computer 10 has a central processing unit (CPU) 12. In the preferred embodiment, the CPU is an Intel Pentium microprocessor, although the present invention can be used with other microprocessors as well. A CPU 12 is connected to a Memory 14. A memory 14 is typically the newer Synchronous Dynamic Random Access Memory or the older Dynamic Random Access Memory configured in Single Inline Memory Modules (SIMM). A CPU 12 is also connected to an I/O Controller 16 that is in turn connected to a Keyboard 20 and Display 22. Network 18 interface card is a common addition to many personal computers and is also connected to a CPU 12. Mass Storage Device 24 and removable media device 26 are similarly connected to a CPU 12. The present invention can be implemented on other types of computers besides a computer 10 shown and described in FIG. 1.

Overview

The present invention requires two Common Information Model (CIM) databases of the same or different Energy Management System (EMS) data formats are constructed prior to integration. Referring to the high-level overview described in FIG. 2, a Source raw EMS data file(s) 50, extracted from a running EMS system, is imported 52 into the CIM format to produce a fully electrically connected database 54. The imported database can then be viewed and/or edited 56. A second file or set of files 58 extracted from a running EMS is similarly imported into a CIM format 60 and produces yet another fully electrically connected CIM database 62. An Imported database 64 can then be viewed and/or edited. The two previously mentioned databases are user selected by their database file name and integrated 66. The process of integrating the contents of the two power systems databases monitors the equipment's electrical connections. Upon completion of the process, a check for dangling or disconnected equipment 68 is made. Responsive to a positive result, a graphical user interface assists the user in resolving any disconnected equipment 70. A user may not desire to expend the effort to fully connect all of the electrical equipment at this time so that connections can be severed later using the graphical user interface. Such would be the case when a user wanted to remove an entire substation instead of resolving a large number of electrically disconnected devices for the purposes of enumerating "what if" scenarios. A partially or fully electrically connected database containing the all of the contents of the original two databases is then stored as a new database 72. Responsive to a user's desire to add another database 74, it must be ascertained if the database 76 is already imported. Positively responding to an already imported target database, the user would integrate the two CIM databases 66 to exercise different integration options. Negatively responding to the query 76 requires that a completely new CIM compliant database be constructed by obtaining new EMS raw data file(s) 58. Responsive to a negative result to the query at step 74, a query at step 78 is to determine if the user has selected to convert the final CIM database to the native EMS data format. Responsive to a positive result to the query at step 74, exporting the CIM database to an EMS specific data format 80. Responsive to a negative result to the query, proceeding to step 82 in which the entire process is completed.

Import Filter

Figure 2:
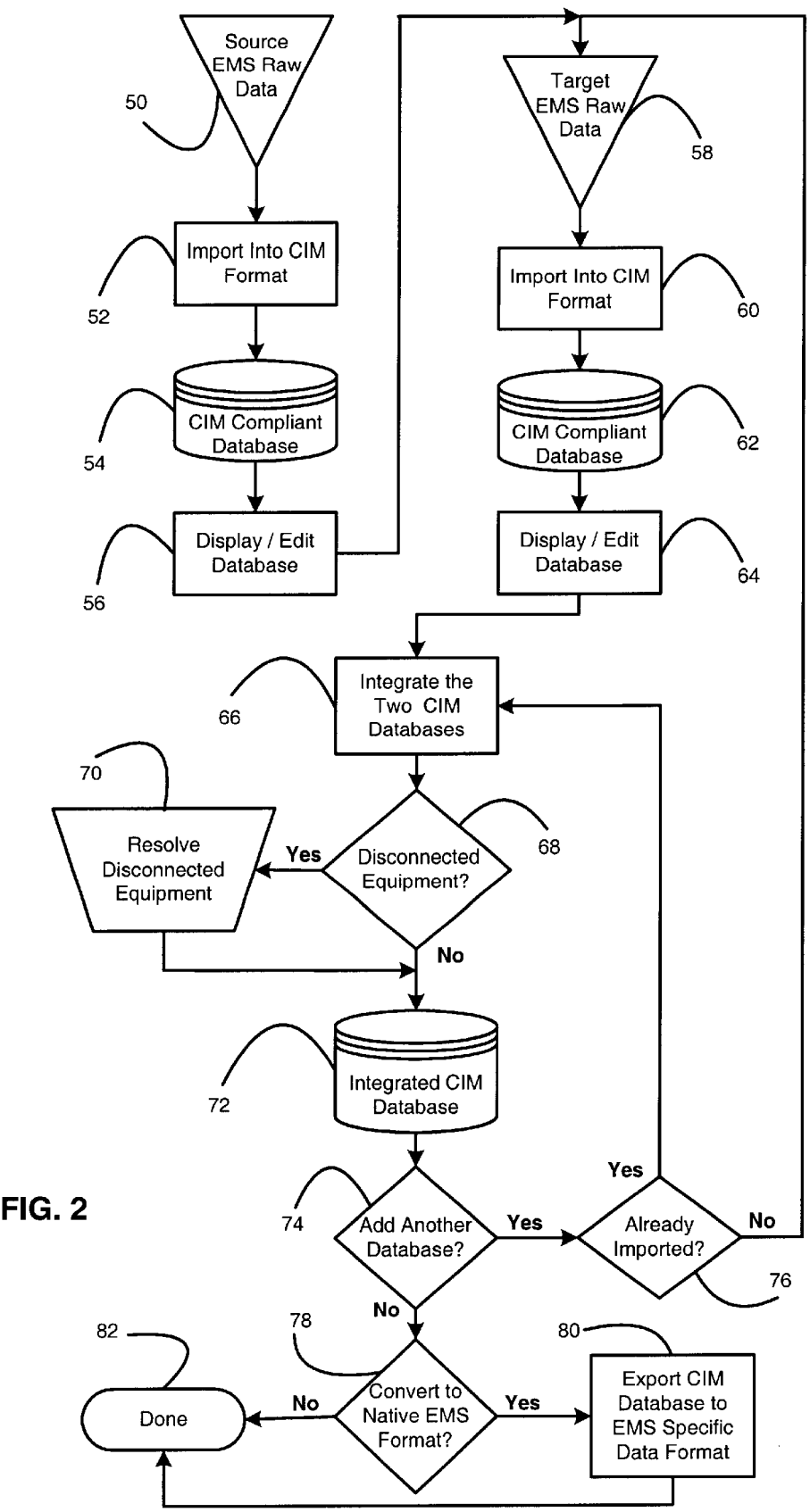
FIG. 2 is a data flow diagram of the basic overview in accordance with the present invention.
Figure 3:
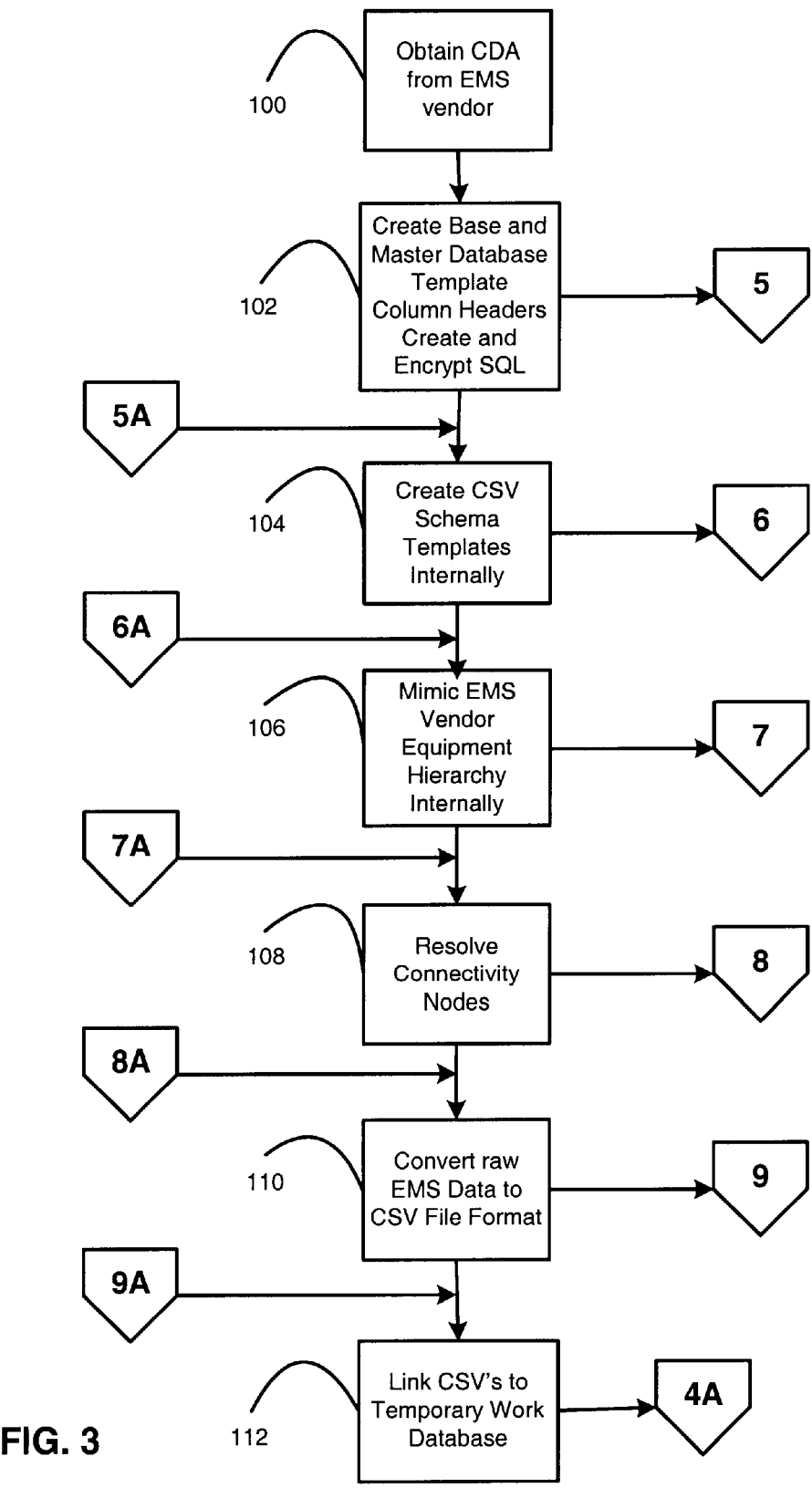
FIG. 3 is flow chart of the steps used to develop an import filter that converts raw electrical power system data into a Common Information Model.

The method of FIG. 2 step 52 is further detailed in FIG. 3 which details how a computer program can be constructed to develop an "Import Filter" that converts EMS specific raw data into the CIM format. In the preferred embodiment of the present invention this is constructed as a Dynamic Link Library (DLL) for each EMS vendor data format. The DLL uses common code sequences contained in lower level DLL's so that the final DLL is constructed using minimal computer coding effort comprising mostly the differences in the EMS data formats.

All EMS vendors fiercely guard their secrets of operation, which includes their data format of the various power systems equipment and the data layout within the file(s). Currently, it is necessary to obtain a confidential disclosure agreement or non-disclosure agreement from an EMS vendor 100 to obtain a detailed data format specification and an example of the data as extracted from a running EMS system.

Create Base and Master Database Templates

Figure 5:
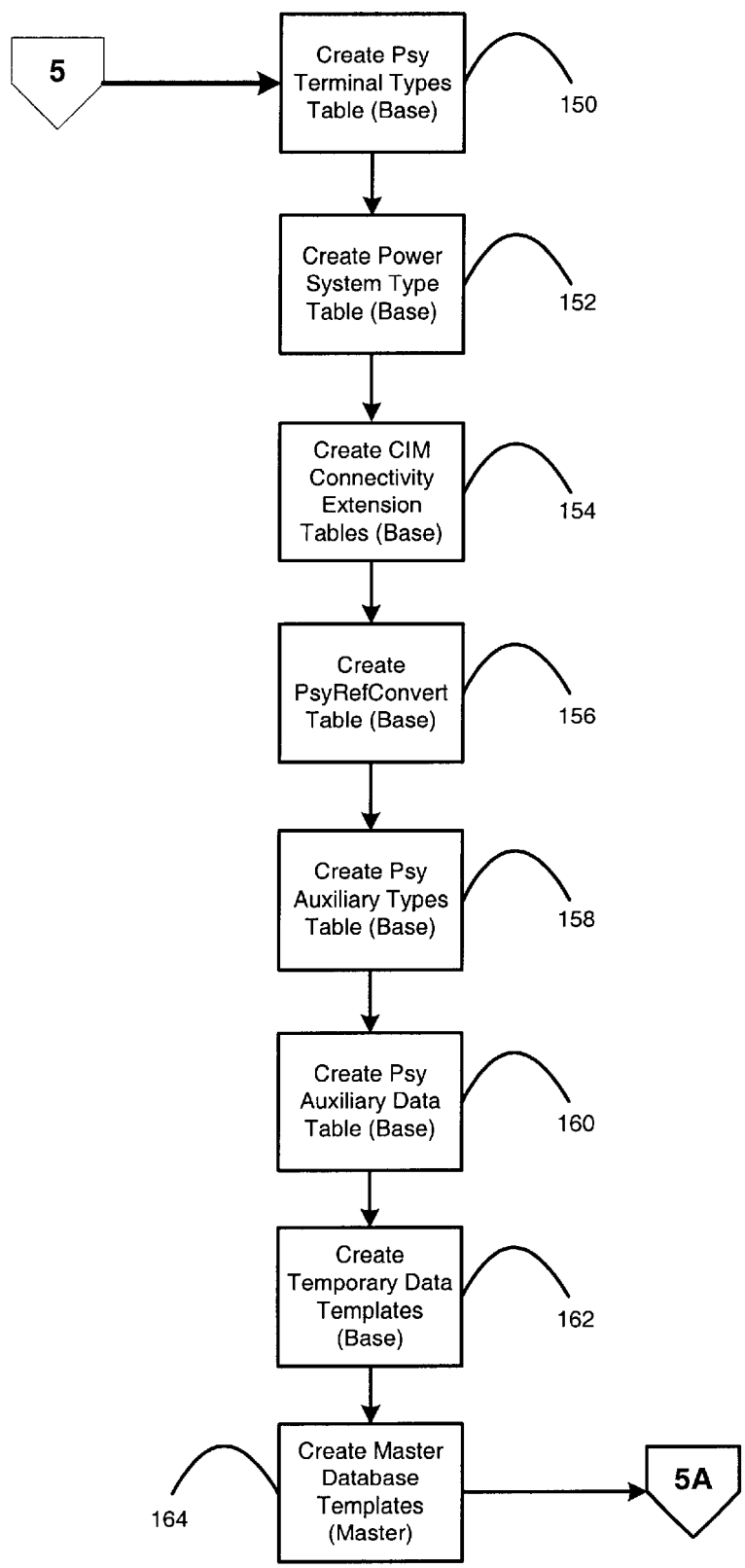
FIG. 5 is a flow chart of the process used to create a database template in accordance with the present invention.

The computer programming begins with creating a base and master database templates containing column headers 102 as described CIM specification for all of the equipment types present in the EMS vendor specific data and/or the data format specification. Step 102 is further defined in FIG. 5 wherein the creation of a PsyTerminalTypes table 150 assigns a numeric value and enumerates the terminals associated with power systems equipment type. This is used internally to provide connectivity information and is an example of CIM extension. An example of this table in the preferred embodiment of the present invention is detailed in FIG. 13. Creation of a Power System Types table 152 provides the order in which power systems equipment is processed based on the EMS specific data layout and contains a running total of each of the power system equipment type. The equipment processing order is statically assigned while the running index is populated at run time as further illustrated in FIG. 12. Creation of CIM connectivity tables 154 provide extensions to the CIM that are used throughout all processing stages (import, export, GUI and database integration). Additional connectivity table examples employed in the preferred embodiment of the present invention include:

1) FIG. 14 that is the top level connectivity extension;
2) FIG. 15 that enumerates switch types and specific codes to specific companies;
3) FIG. 17 that details various internally tracked index markers; and
4) FIG. 19 that details specific connectivity extensions.

Figure 20:
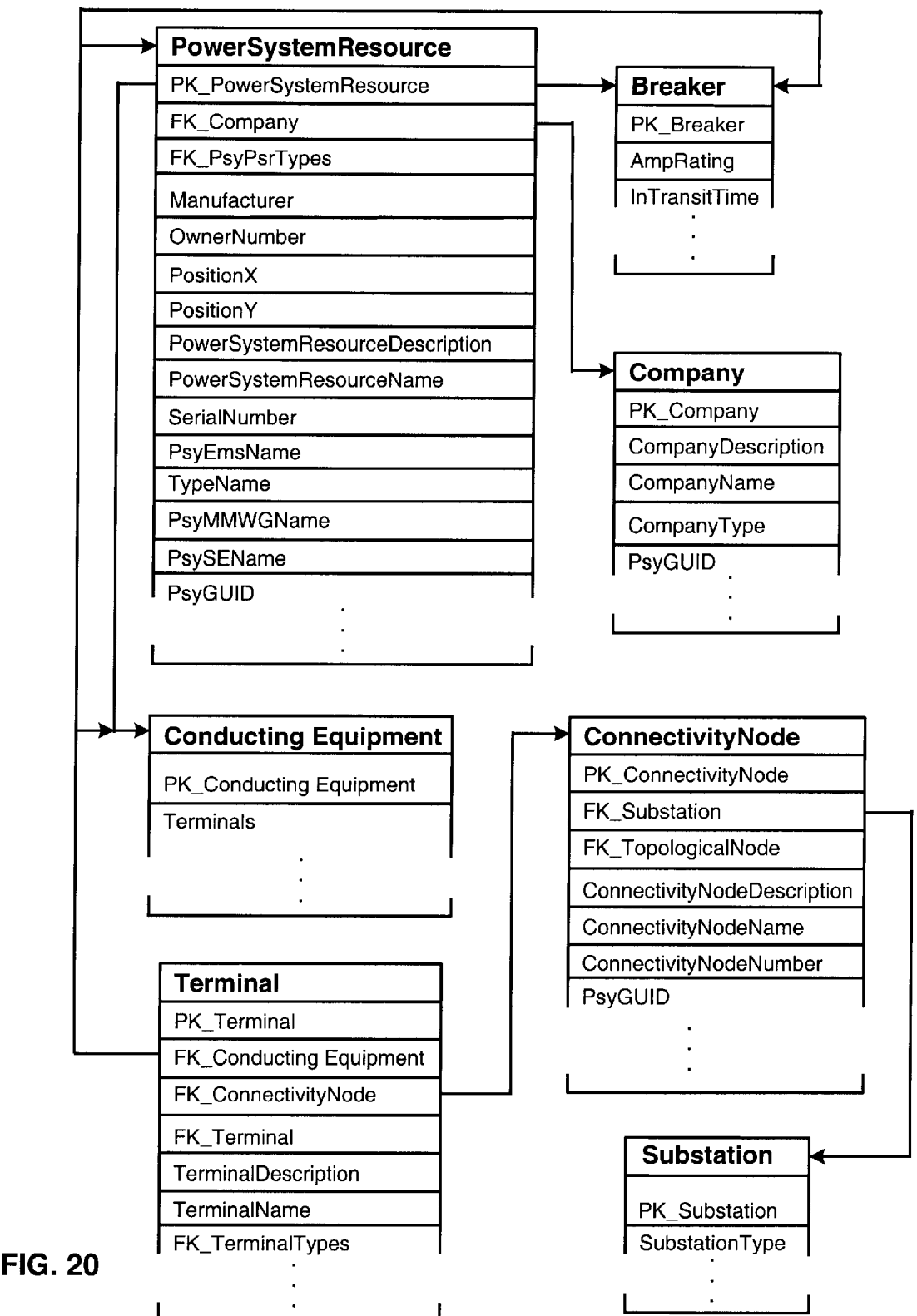
FIG. 20 is a connectivity example of the table relationships for a specific power systems device (Breaker) in the preferred embodiment of the present invention.

There are many more similar examples employed in the preferred embodiment of the present invention to the point that specific connectivity tables provide overall interconnectivity throughout the entire data set. Creation of a PsyRefConvert table 156 records the specific EMS conversion type and success condition. This is further illustrated in the table of FIG. 16. Creation of an PsyAuxiliary Types tables 158 provides flexibility of the base work table to temporarily store EMS specific equipment types for later consolidation. Similarly, creation of an Auxiliary Data table 160 enables partial data sets to be processed into a single value for the final fully electrically connected database. Both aforementioned tables are generally employed when the data or equipment type is very near to the related CIM specification for the associated data or equipment type. Creation of a Temporary Data templates 162 enables multiple database tables to be successively populated with power systems equipment or data that is considerably different than the equivalent CIM definition for the equipment type. Typically, this applies to items such as the load area, load area interchange and transformer characteristics due to the various metrics and area definitions employed by the various EMS vendors. Creation of a Master Database Template 164 populates the CIM compliant definitions with table names and related content as exists in the final fully electrically connected database. The table of FIG. 18 illustrates a BusBarSection table in the Master database that is CIM compliant as it is derived from an associated CIMBusBarSection in a worktable of FIG. 17. An example of the master database table relationships for an example Breaker device in the preferred embodiment of the present invention is illustrated in FIG. 20. Next, Sequential Query Language (SQL) is produced to populate the fields for all of the equipment in accordance with the previously described table formats. To protect the EMS vendor's data format, the SQL statements are encrypted and stored on a disc file.

Create Comma Separated Values (CSV) Schema

Referring back to FIG. 3, creation of multiple commaseparated values (CSV) schema templates 104 internally is done by extracting the EMS specific data structures from the supplied documentation and storing this into a text file. These are used as placeholders while the actual raw data is read into memory. This process is further defined in FIG. 6 at step 200 that will match the EMS elements to the CIM objects. For example, switch is extracted from the raw data and is also a CIM object. This process is repeated for all equipment types. Further refinement is detailed by matching the EMS object fields to CIM object fields 202 where it is applicable. This minimizes the need for auxiliary tables and data during import processing. The EMS data format specification generally contains objects and data fields that are not part of the CIM specification. However, it is possible that this data may be required at a later time. Step 204 includes EMS specific objects and data into the CSV schema. FIG. 7 illustrates a code fragment sample of a company declaration of the CSV schema in the preferred embodiment of the present invention.

Mimic EMS Hierarchy

Referring back to FIG. 3, EMS specific data format varies widely, and therefore it is necessary to mimic EMS vendor equipment hierarchy internally 106 to properly populate the previously created CSV files. Referring now to FIG. 8 for further details, it is apparent from the EMS data format specification how the data is organized. Responsive to the data having a flat data organization, a return to FIG. 3 is indicated. Responsive to the EMS data format having a multi-leveled organization in the query of step. 250, it is necessary to create, an internal structure that mirrors the equipment levels 252. One or more data files will be associated with a particular processing level and it will be required to match the processing level index to an input file name 254. Processing the data will require the creation loops in code fragments for each sub-level defined in a EMS raw data specification 256. FIG. 9 illustrates a sample of a multi-leveled or hierarchical EMS specific data format coding example in the preferred embodiment of the present invention.

Generate Connectivity Nodes

Figure 10:
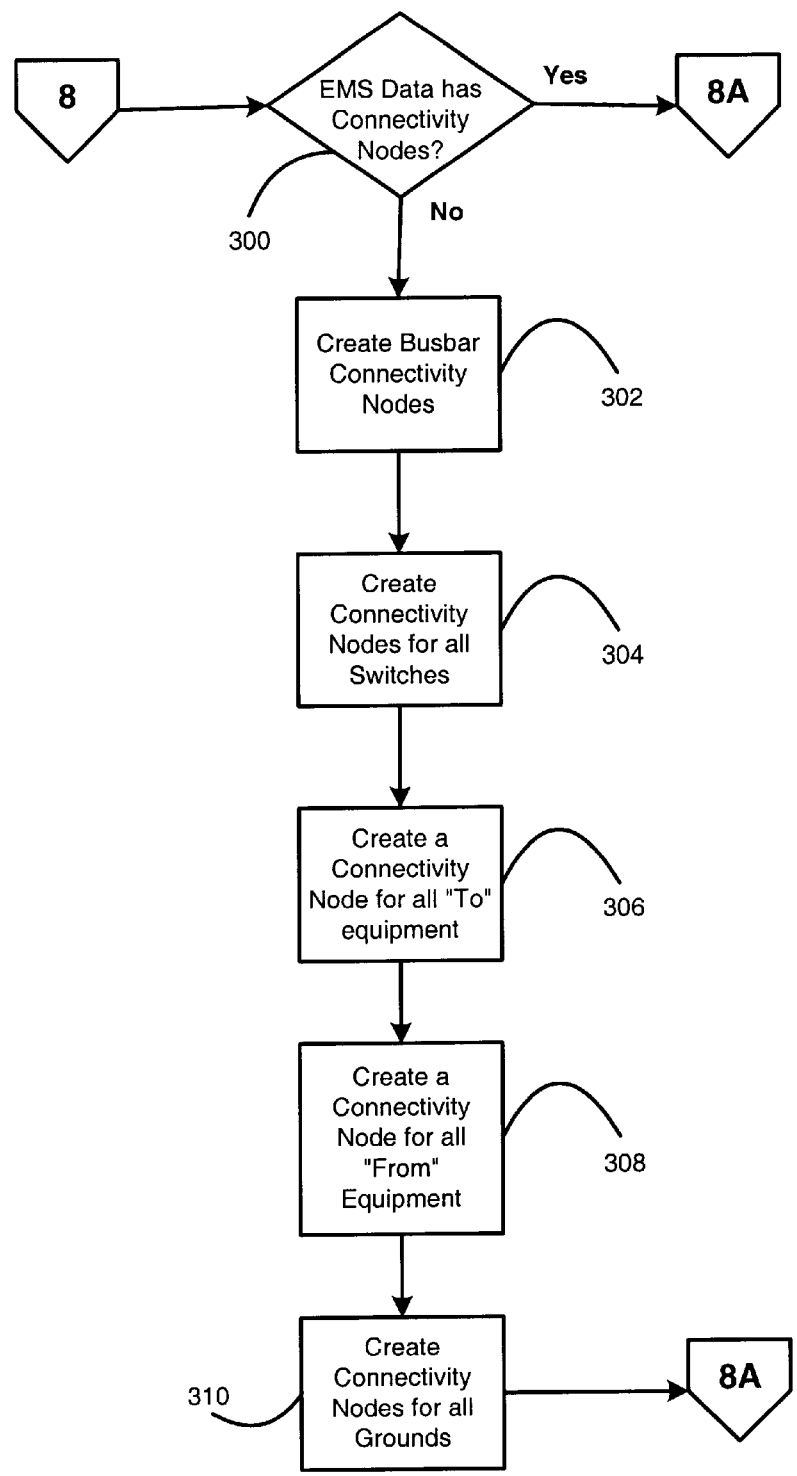
FIG. 10 is a flow chart that describes the steps used to generate connectivity nodes when they absent from the primary raw EMS data fields in accordance with the present invention.

Referring back to FIG. 3 at step 108, the status of the raw data in relation to the connectivity nodes must be resolved. Further details are revealed in FIG. 10 where the EMS data format is examined. Positively responding to the presence of connectivity data in the query at step 300 renders the Import Filter construction process back to FIG. 3 at step 110. Negatively responding to EMS data containing connectivity nodes 300 requires additional processing. EMS vendor data formats lacking direct connectivity nodes incorporate this information at the device level. Although data population of the connectivity work and master tables (CimConnectivity and Connectivity) is not performed at this time, it is necessary to make preparations. Creation of Busbar Connectivity Nodes 302 requires that data associated with connectivity be obtained from the actual EMS raw data files such that a fully populated and connected connectivity node be constructed as previously illustrated in FIG. 19. Similarly, connectivity nodes need to be ready for all switches 304. Remaining power systems equipment will be divided into a "To" 306 or "From" 308 designation as referenced from the primary busbar from which the device is connected. Connectivity nodes for grounds 310 require only a single terminal and are similarly processed.

Convert EMS Raw Data to CSV File Format

Figure 11:
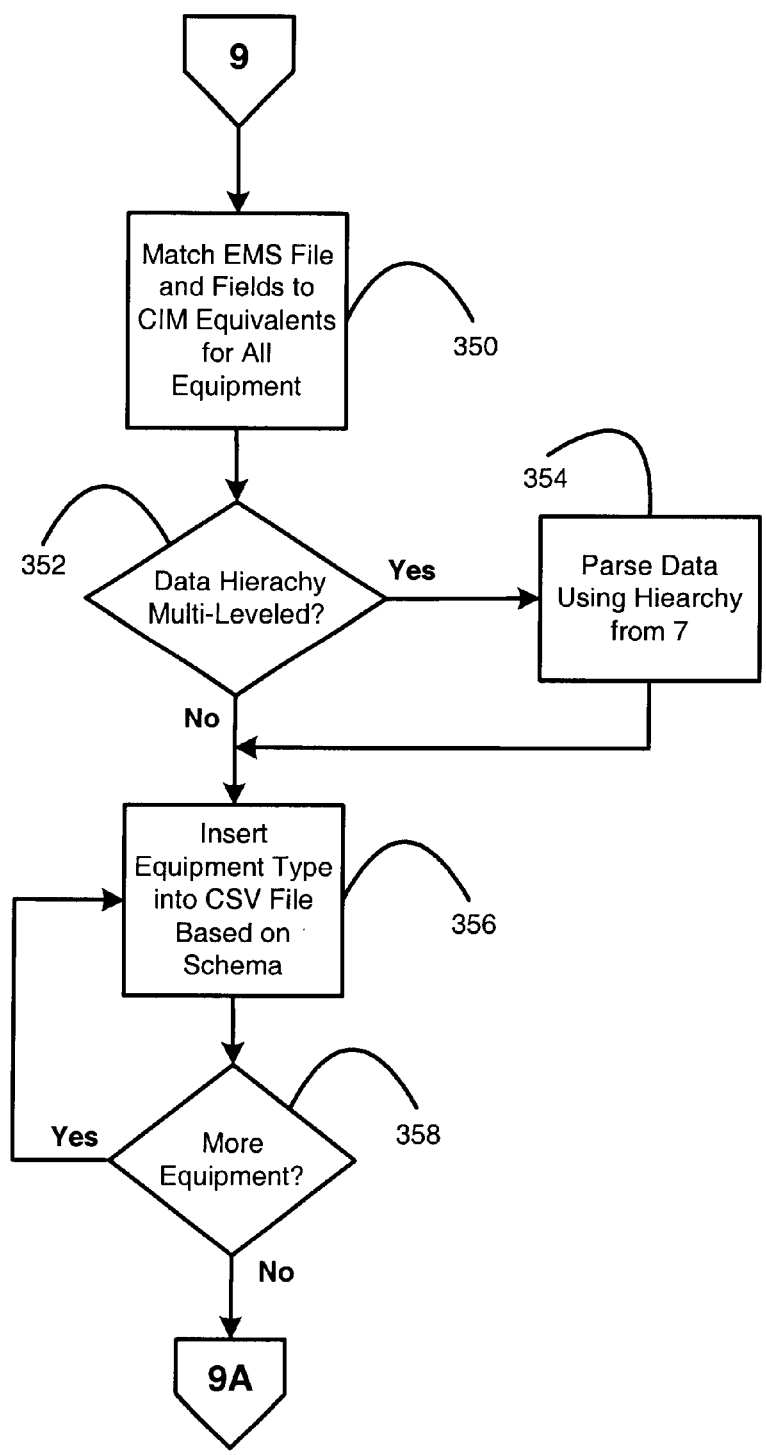
FIG. 11 is a flow chart that describes the steps used to generate comma-separated values (CSV) of the raw data for inclusion into the power systems database in accordance with the present invention.

Referring back to FIG. 3 at step 110, converting the raw EMS data to a CSV format is further detailed in FIG. 11. Previous preparations are now ready for execution of the code sequences relevant to the processing stage. Raw data extracted from a running EMS is matched to the file and field names to their CIM equivalents 350. Responsive to a positive result at query 352 for the data format having a multi-level hierarchy, parsing the data in congruence with the structure 354 provided. Responsive to a negative result for the query 352, using a flat data organization to populate the CSV file(s). Inserting the data representation of the physical equipment and other elements into the CSV file based on the previously developed schema 356 for the current data element. When there is more equipment to process in the query at step 358, return to step 356. Return processing back to FIG. 3 at step 112 when all data has been processed.

Referring back to FIG. 3 at step 112, a program generated CSV file(s) are dynamically linked into the Base database. This effectively adds the generated files as new tables to be processed in the Base database.

Figure 4:
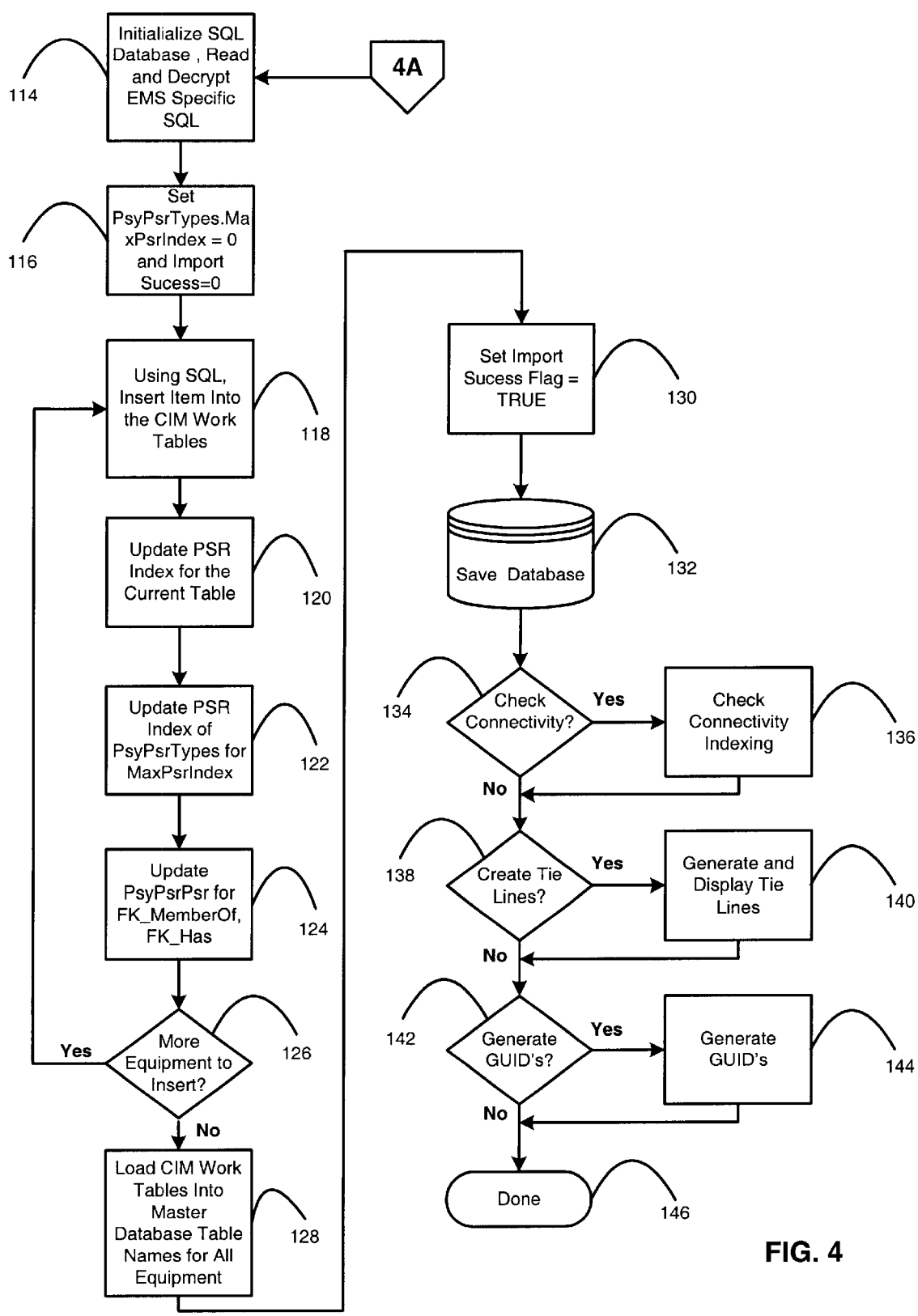
FIG. 4 is continuation of FIG. 3 and details the database query language protocol structure and operation of the present invention.

Referring now to FIG. 4 at step 114, a database is initialized, the source and target conversion is recorded (FIG. 16), the import success flag is set to the failed condition. The value 116 of the MaxPsrlndex in PsyPsrTypes (FIG. 12), which controls the order in which the equipment is processed, is set to zero. The previously constructed and encrypted SQL statements are now read into memory and decrypted. The various power systems equipment present in the raw data has been translated into database tables from CSV format and is now accessed using SQL to populate the previously constructed worktables. Item insertion is done for all of the equipment of a particular type into the worktables of Base template 118 based on the data in the predefined order of FIG. 12. Processing begins with the company, area, division, substation and finally the substation contents. Associated Psrlndex is updated 120 for the current table on a per entry basis with consecutive numbers that effectively assigns a unique power system resource index. For example, in FIG. 17 this would be the value assigned to the Psrlndx. A running total for all of the devices and objects is updated using a MaxPsrlndex 122. A list that contains an entry for all devices and objects processed from the EMS specific raw data is updated in table PsyPowerSystemResourcePowerSystemResource for a $FK_{13}$ MemberOf and $FK_{13}$ Has 124 relationship that binds all data elements processed into a single table. Responsive to a positive result in the query at step 126 for more equipment to be processed, the logic is repeated at step 118. Responsive to a negative result in the query at step 126 for more equipment to be processed, the work tables containing all of the connectivity indexing are discarded as the results are collated into the final CIM compliant table names and column entries 128. Next, Import success flag 130 is set to true. The resulting data is then saved into a permanent file format 132. This completes the construction of the Import DLL in the preferred embodiment of the present invention and the graphical user interface processes the various user-selected options. Responsive to the query at step 134 to check equipment connectivity having a positive result, various connections 136 are checked for all of the equipment present. In the normal operation of importing the EMS specific raw data for the first time, this option is typically not selected. In practice, this option is used to verify the internal connections when the user adds or deletes equipment using the graphical user editing capability, or when original raw data files were manually modified. The check proceeds from the terminal and connectivity nodes and verifies that the indexing is proper and present as previously illustrated in FIG. 20 in the preferred embodiment of the present invention. Detailed equipment connectivity checking is presented in the database integration (Step 66 of FIG. 2) section because it is not currently part of the Import Filter specification in the preferred embodiment of the present invention. Responsive to the query at step 134 to check equipment connectivity having a negative result, checking the user-selected option to create Tie Lines 138. Responsive to this query to create the Tie Lines having a positive result, generating and displaying the Tie Lines as extracted from the database table associated with Tie Lines in a scrollable window. The generate Global Unique Identifiers (GUID's) query at step 142, Generates GUID's 144 down to the substation and/or equipment level with the generated number being unique within the contents of the database. The Import of the raw EMS is completed at step 146 and the Network Topology Editor of the graphical user interface becomes enabled. This completes the instruction on how to construct the Import Filter.

User Level Import Processing Steps

Figure 21:
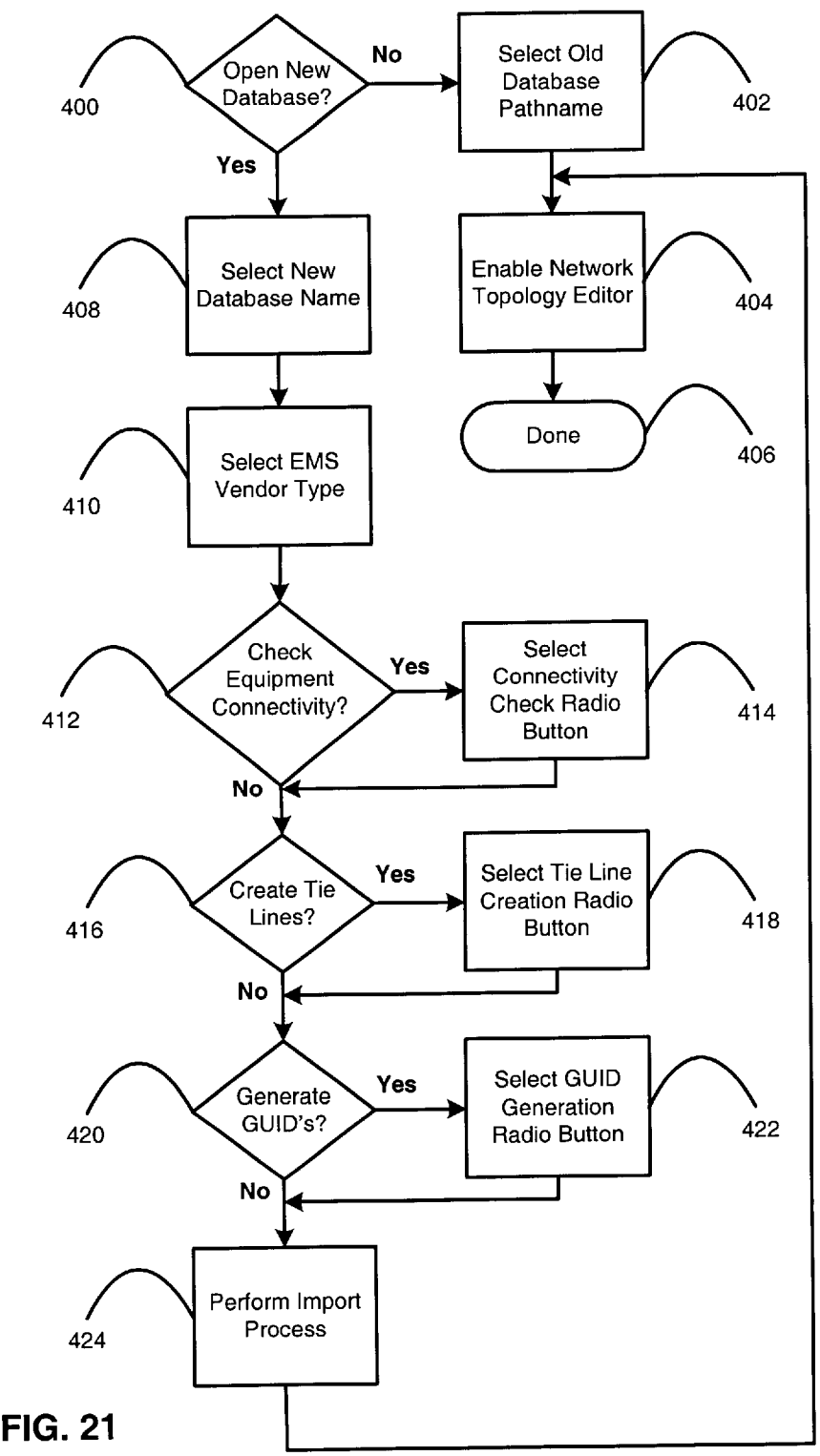
FIG. 21 is a flow chart of the user level steps of the Import process in the preferred embodiment of the present invention.

User-level operation is detailed in FIG. 21 that illustrates importing raw EMS data and the interoperability of the graphical user interface. Responsive to a negative result in query at step 400 to open a new database, the user selects a previously stored database 402 by pathname. The graphical user interface responds to the opening of the database by enabling a Network Topology Editor 404 to view and possibly edit the power systems data. The Import process is complete at step 406. Responsive to a positive result in query at step 400 to open a new database, the user selects a new database name and target path location 408. From the graphical user interface's drop down list, the EMS vendor type 410 is selected. The graphical user interface will present a panel with three radio buttons encompassing steps 412 through 422. Responsive to the user's desire to check equipment's connectivity at the query of step 412, the user selects and sets the radio button associated with equipment connectivity 414. Responsive to the user's desire to create Tie Lines at the query of step 416, the user selects and sets the radio button associated with Tie Line creation 418. Responsive to the user's desire to generate GUID's at the query of step 420, the user selects and sets the radio button associated with automatic GUID generation 422. Next, the Import Filter DLL is loaded into memory and executed 424 in response to the OK button on the graphic panel. Processing continues at step 404 and completes at step 406 to enable the Network Topology Editor.

Graphical User Interface (GUI)

Figure 22:
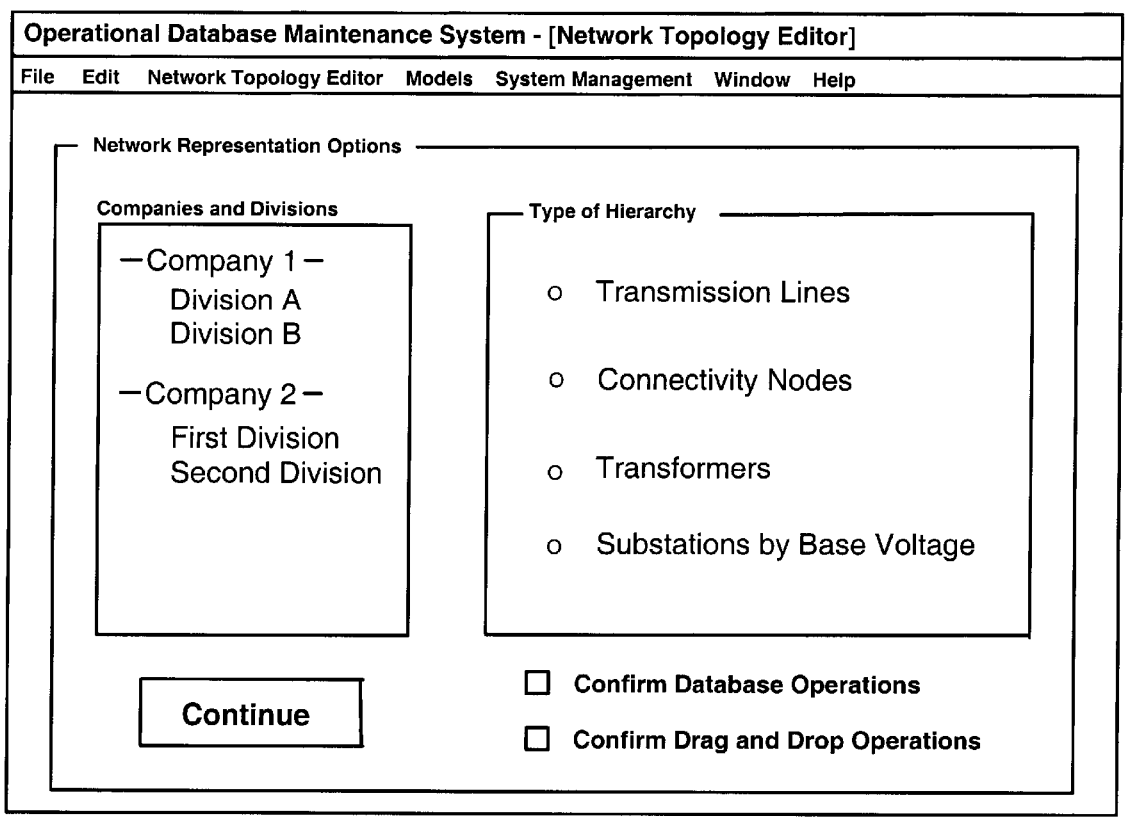
FIG. 22 is a representation of the graphical user interface for the Network Topology Editor in the preferred embodiment of the present invention.
Figure 23:
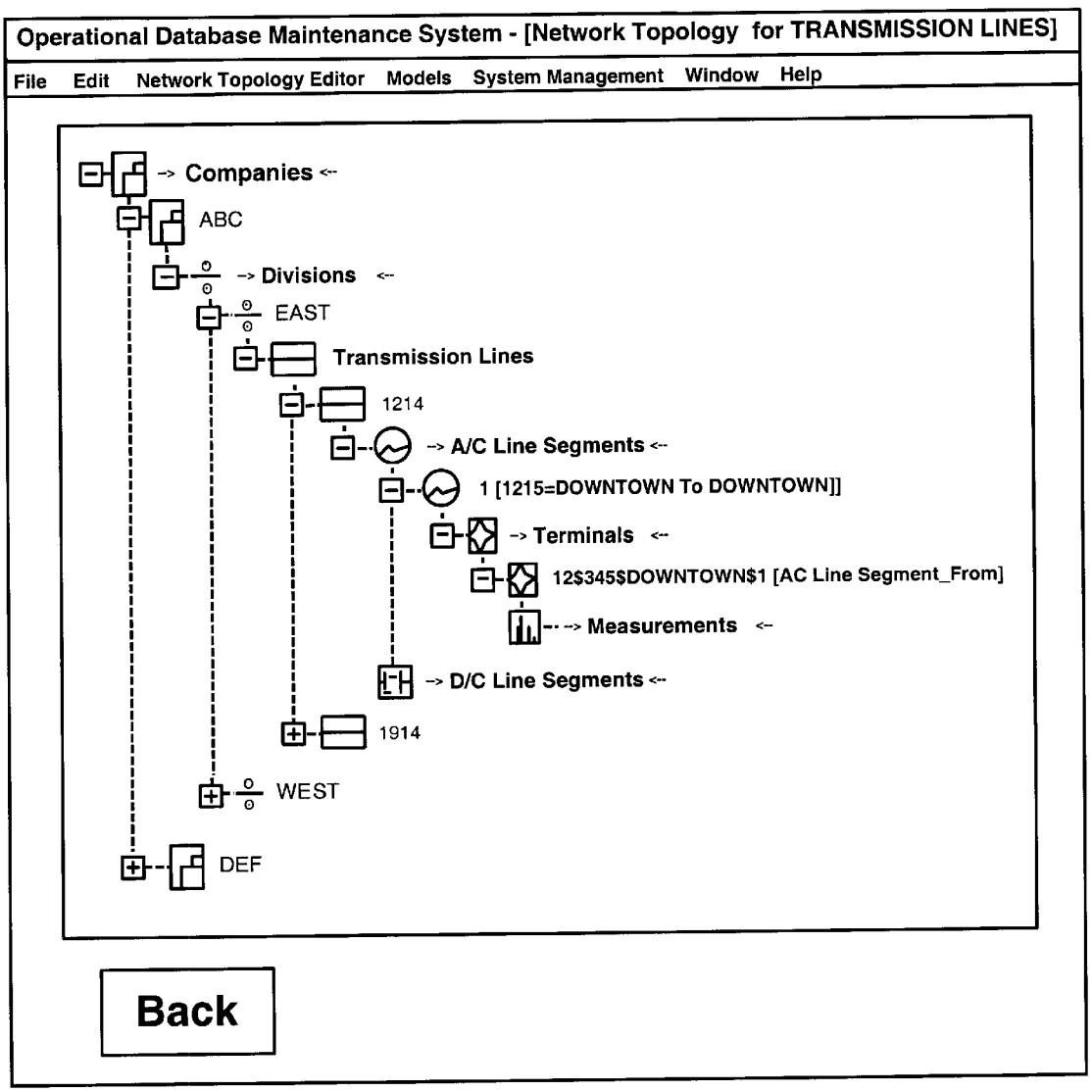
FIG. 23 is a representation of the Transmission Lines view of the graphical user interface in the preferred embodiment of the present invention.
Figure 24:
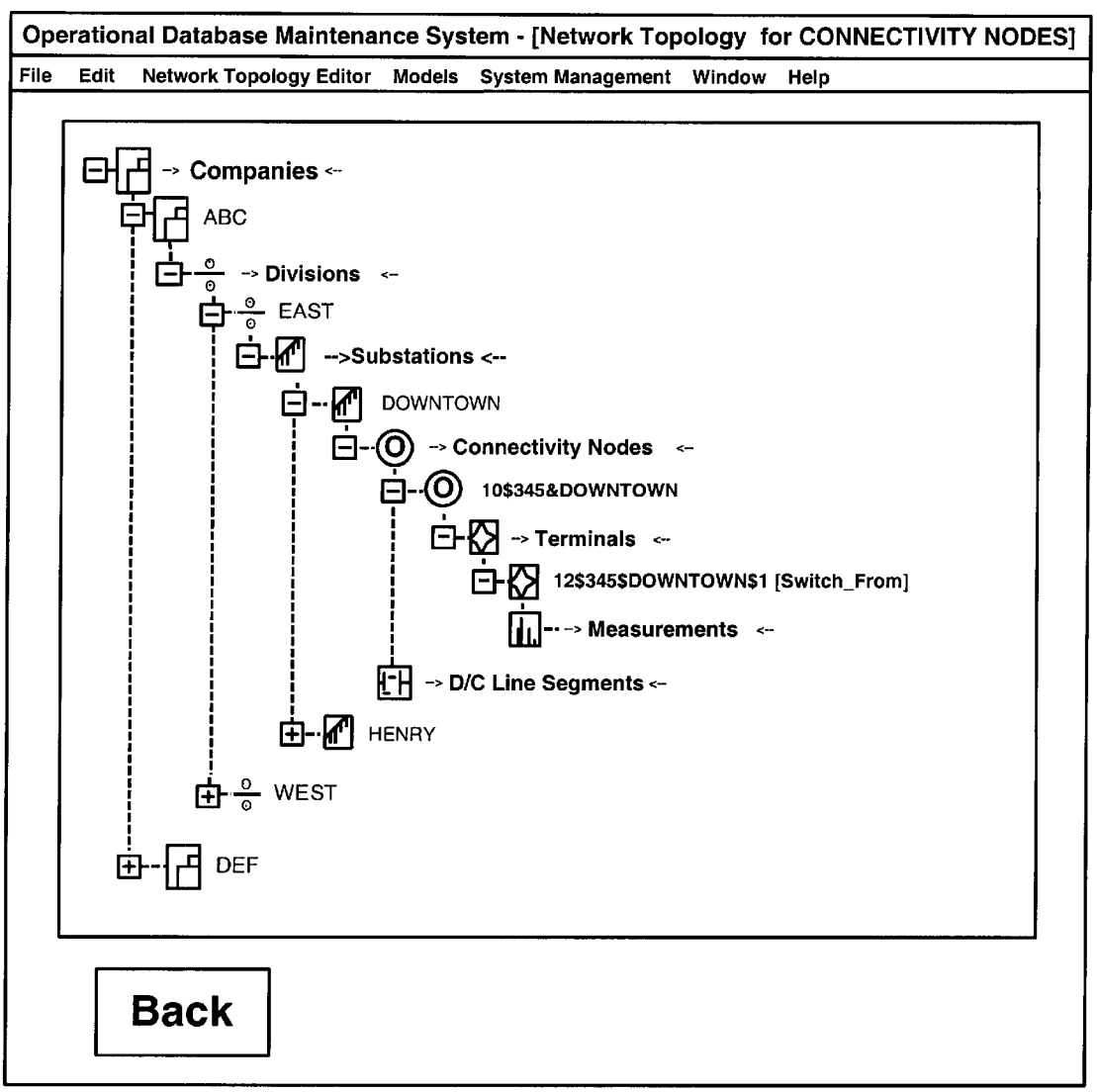
FIG. 24 is a representation of the Connectivity Nodes view of the graphical user interface in the preferred embodiment of the present invention.
Figure 25:
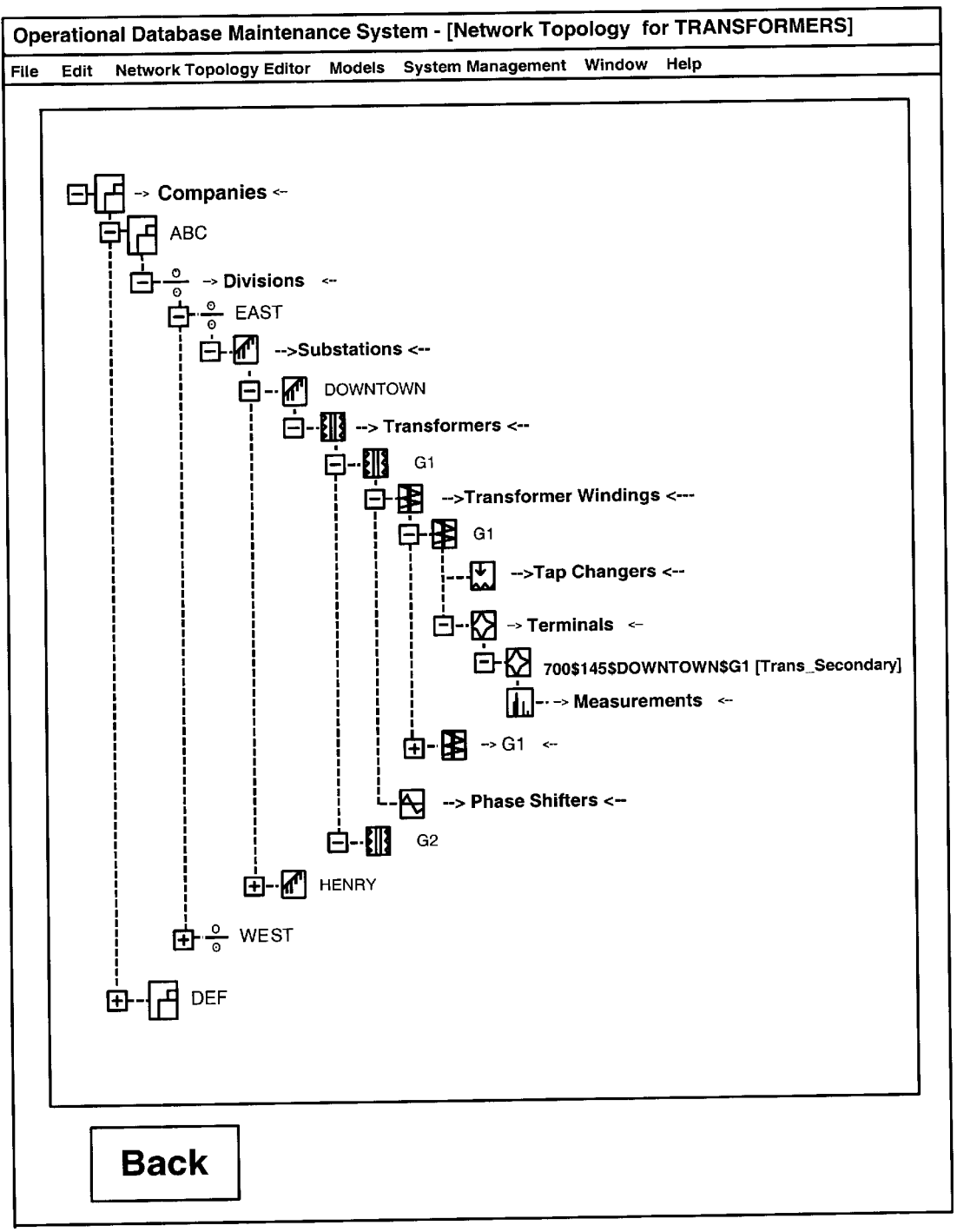
FIG. 25 is a representation of the Transformers view of the graphical user interface in the preferred embodiment of the present invention.
Figure 26:
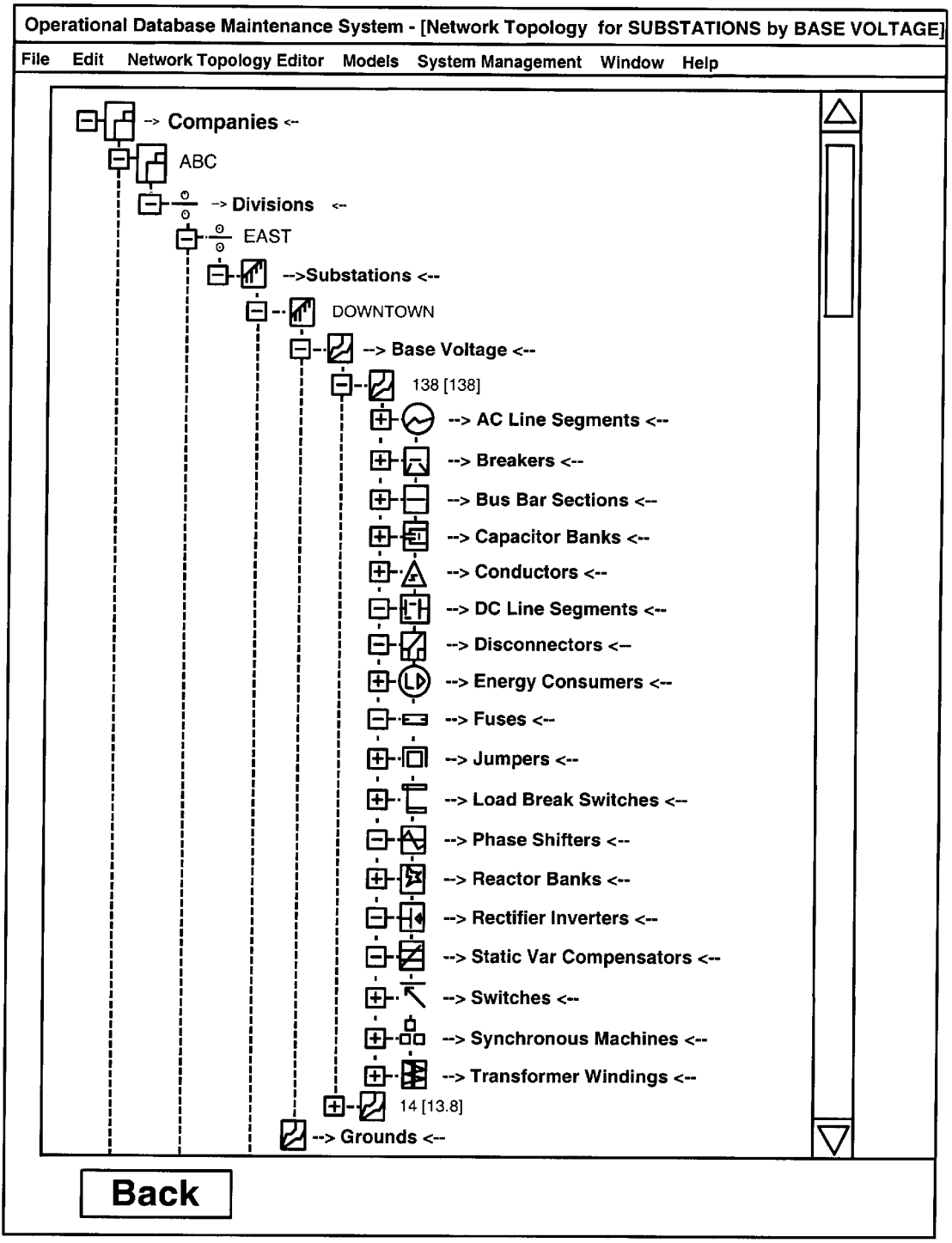
FIG. 26 is a representation of the Substations by Base Voltage view of the graphical user interface in the preferred embodiment of the present invention.
Figure 27:
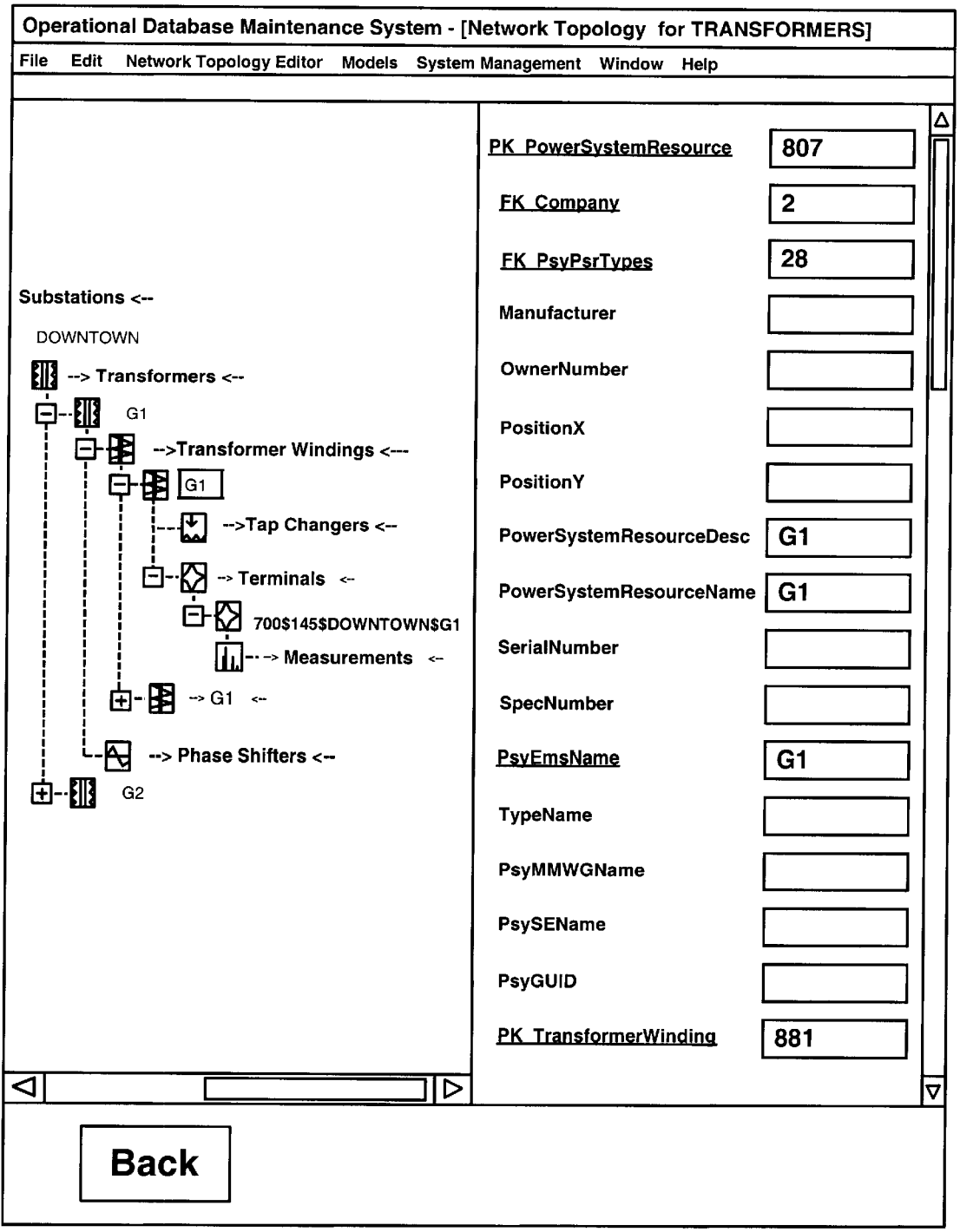
FIG. 27 is an example representation of the editing capabilities for the various devices in the views of the graphical user interface in the preferred embodiment of the present invention.

The method of FIG. 2 step 56 to display and/or edit the database is actually the graphical user interface (GUI). This provides a distinctive and unique view of the power systems equipment as illustrated in FIG. 22 that contains various types hierarchy from which the user can display and edit the data in the preferred embodiment of the present invention. A company or plurality of companies is selected along with a type of hierarchy from this panel. The transmission lines display in FIG. 23 illustrates the hierarchy and detail that a database user would have to display and/or edit the data. The "connectivity nodes" display in FIG. 24, "transformers" display in FIG. 25 and "substations by base voltage" in FIG. 26 similarly details the decomposition and edit capability. An example of the editing capability as applied to the transformer view is illustrated in FIG. 27 that details some of the specific power system database tables. An example of inserting a new power system resource as applied to the same transformer view is illustrated in FIG. 28 that details inserting a transformer winding. A base voltage is selected and the Transformer Winding Designation in FIG. 29 is displayed. Deletion is done simply highlighting a device that is displayed in FIGS. 23,24,25, or 26 and pressing the DEL key.

Integrate CIM Databases(Model Merge)

Figure 30:
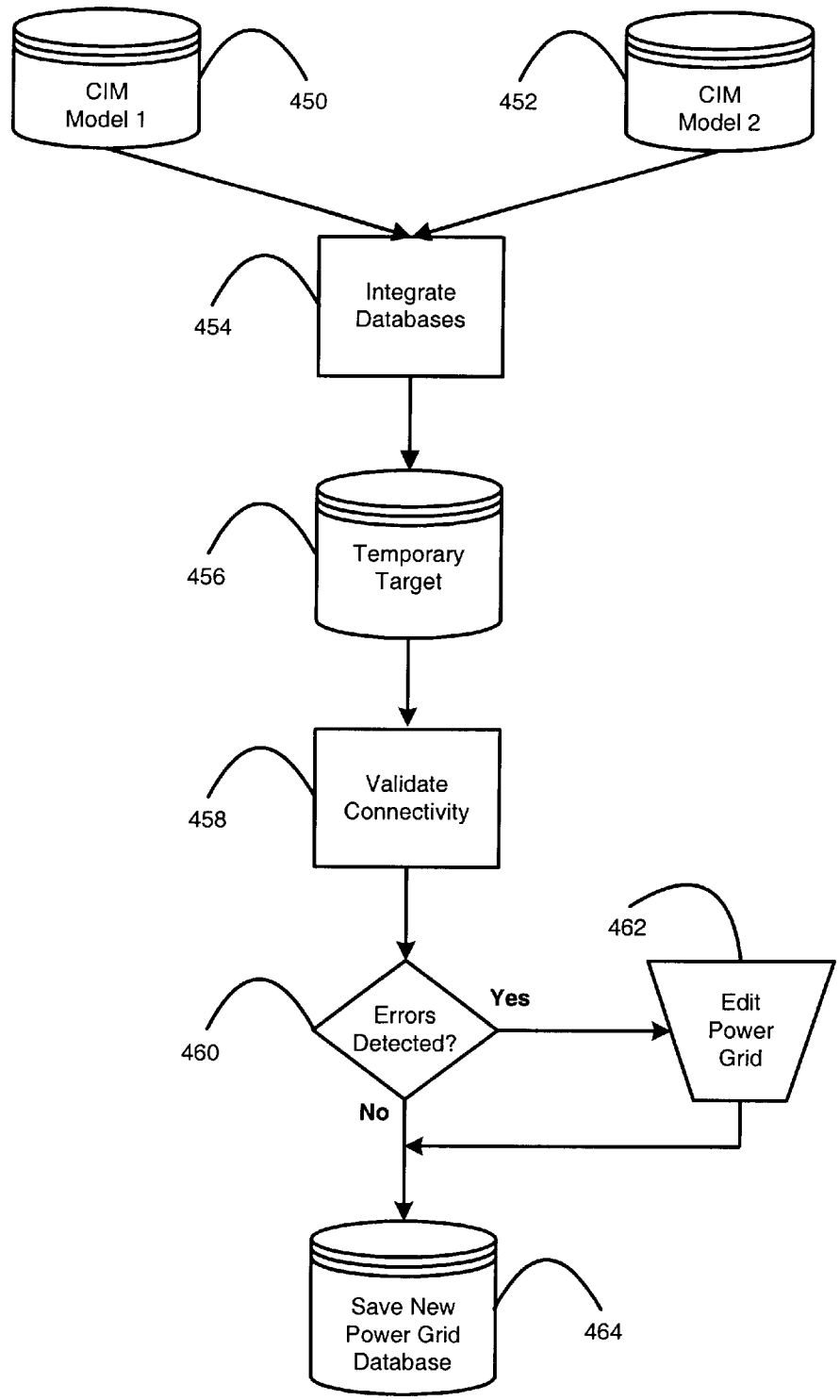
FIG. 30 is a data flow diagram of integrating two Common Information Model (CIM) power systems databases in the preferred embodiment of the present invention.

Integrating two CIM databases from a high-level data flow perspective is illustrated in FIG. 30. Two CIM databases, CIM Model 1 450 and CIM Model 2 452 are integrated 454. This produces a temporary target database 456 that is validated for electrical connectivity 458. If any errors were detected and reported, the query of step 460 provides the user with an automated recovery process that will assist editing of power grid data 462. Responsive to a negative result in the query 460 for errors being detected, saving a new CIM target database 464.

Figure 31:
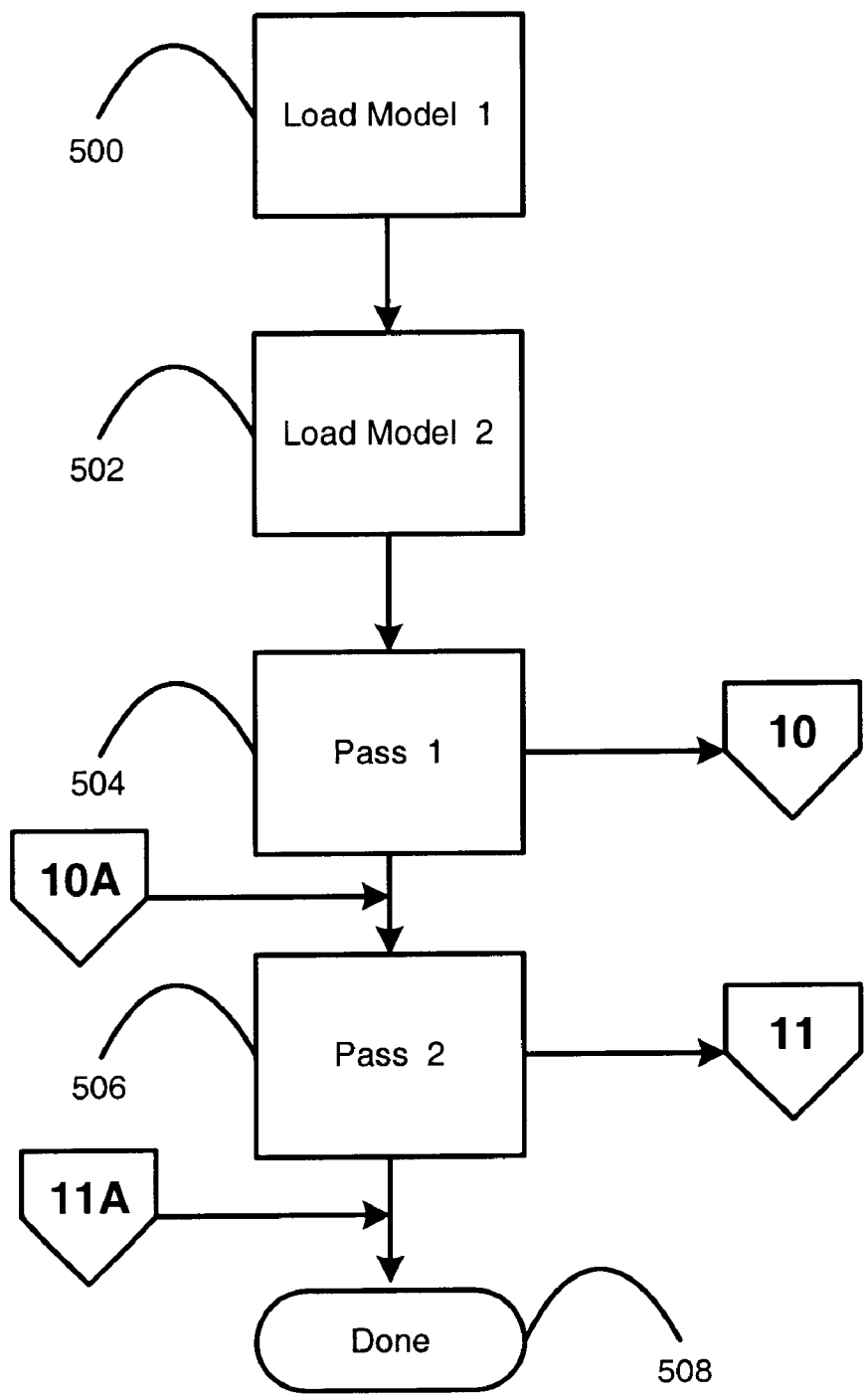
FIG. 31 is a high-level flow chart of integrating two CIM power systems databases in the preferred embodiment of the present invention.

The step 454 of FIG. 30 to integrate the two CIM databases is further detailed in FIG. 31. The first model database 500 and second model database 502 that the user selected is loaded, the tables are linked and pass 1 504 begins.

CIM Database Integration—Pass 1

Figure 32:
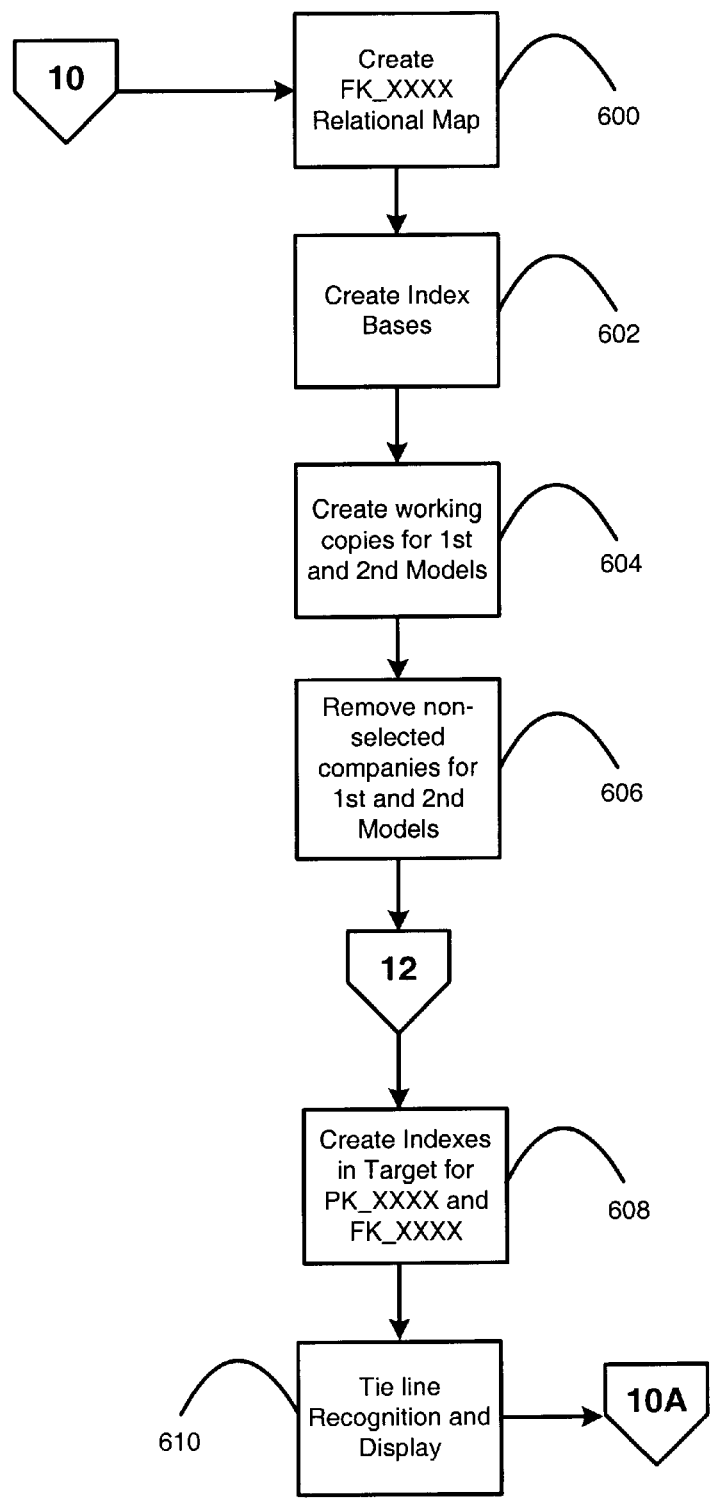
FIG. 32 is a detailed flow chart of pass 1 for integrating two CIM power systems databases in the preferred embodiment of the present invention.
Figure 33:
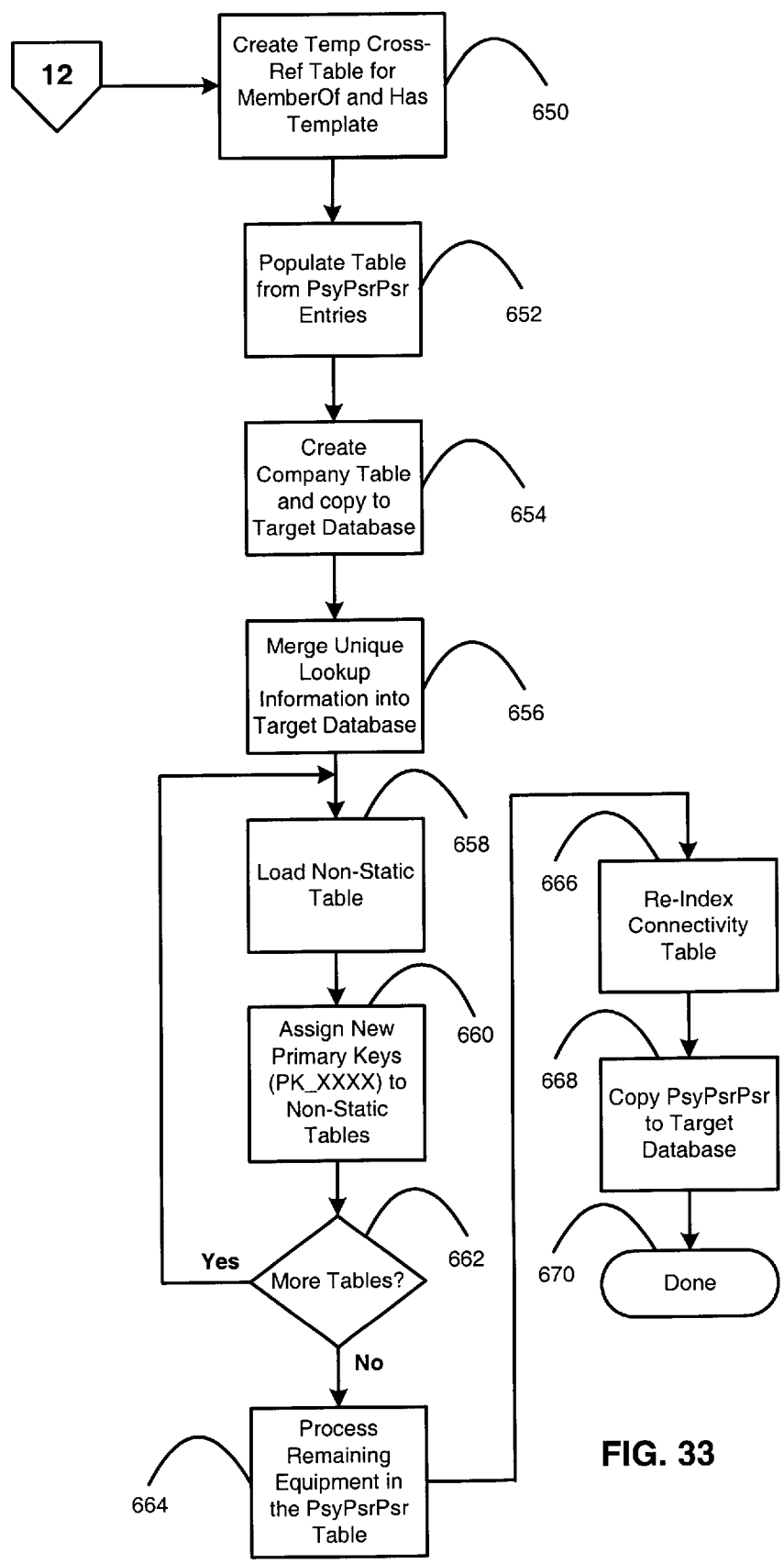
FIG. 33 is a detailed flow chart of for one of the steps of FIG. 32 for integrating two CIM power systems databases in the preferred embodiment of the present invention.

The methodology of pass 1 is further detailed in FIG. 32. A relational map 600 for all of the foreign keys ($FK_{13}$XXXX where XXXX is the MemberOf and Has relationship) of the PsyPsrPsr (CIM extension table for connectivity as shown in FIG. 14) is constructed. This table contains an entry for every element in the database, including non-physica entities such as terminals and connectivity nodes as well as the physical equipment. The $FK_{13}$MemberOF and $FK_{13}$Has tables are duplicated in the temporary database copy and become Old$FK_{13}$MemberOf and Old$FK_{13}$Has. Index bases 602 are created for the various types of equipment. A full copy 604 is made of both selected. All non-selected companies 606 from both models are extracted using SQL to delete the company and al associated data and equipment. Processing continues on FIG. 33 at step 650, which creates a temporary cross-reference table of the duplicated PsyPsrPsr tables. Both tables are joined together in the PsyPowerSystemResourcePowerSystem Resource (yet another CIM extended connectivity table). The new company table containing only selected companies is copied to the user selected target database name 654. The lookup information tables 656 are merged to contain only unique entries in the target database. These tables are generaly different EMS specific measurement metrics and syntax specifications. For example, a measurement unit by one EMS data format may be MW whereas another EMS specific data format may require MWATT. These tables are generaly considered static tables because the contents of the tables are not frequently updated. A non-static table 658 is loaded and new primary keys 660 are assigned. An example of a non-static table is switch table in the preferred embodiment of the present invention. Positively responding to the query at step 662 for more tables, the process repeats at step 658. Negatively responding to the query at step 662 for more tables, remaining equipment 664 is processed. An example of the remaining equipment would be the transmission lines, which are not specifically listed in the CIM specification and are entered into the PsyPowerSystemResource owerSystemResource table for later display. The connectivity table 666 is re-indexed and a temporary PsyPsrPsr (similar to FIG. 14) table is copied into a target database 668. This sub-process is done at step 670 and processing continues at FIG. 32 step 608, where new indexes are assigned to the foreign and primary keys. Next, the Tie Lines are extracted from a TieLines database table 610. CIM Database Integration processing returns to FIG. 31 at step 506 to begin pass 2.

CIM Database Integration—Pass 2

Figure 34:
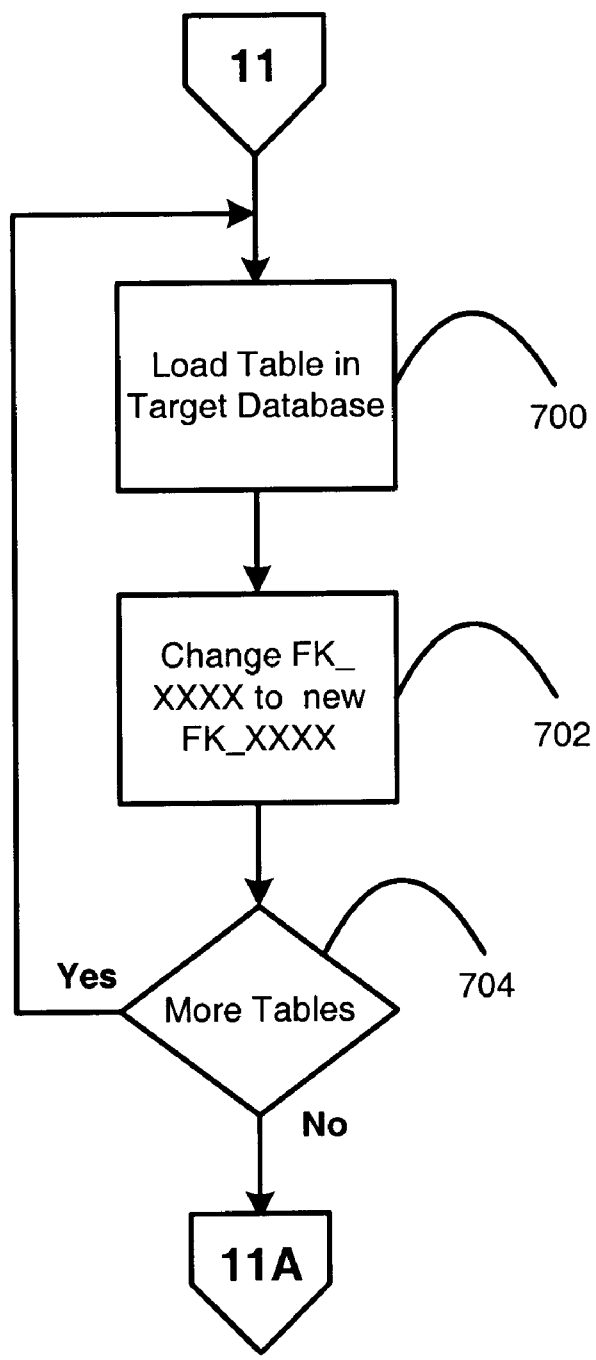
FIG. 34 is a detailed flow chart of pass 2 for integrating two CIM power systems databases in the preferred embodiment of the present invention.

The Pass 2 logic is illustrated on FIG. 34 and begins at step 700 to load a table into the user specified target database name. The new foreign keys are changed into primary keys 702 for the entire table. Positively responding to the query at step 704 returns to step 700 to process the next table and the associated primary keys and foreign keys in the table. CIM Database 508 Integration is done in FIG. 31. Referring now to FIG. 30 and the step 456 to save the generated combined database as the target name that the user previously selected.

Substation Connectivity Check

Figure 35:
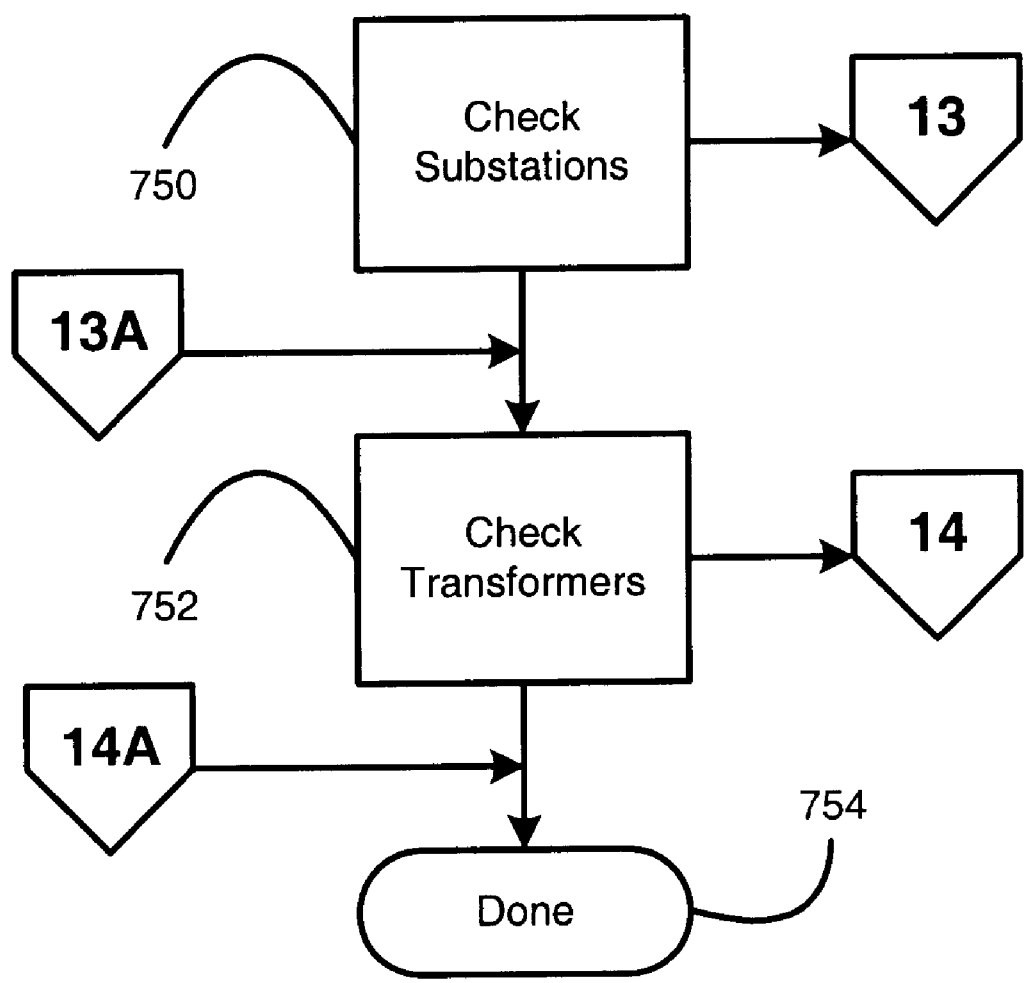
FIG. 35 is a flow chart of the steps used for electrical connectivity checking in the preferred embodiment of the present invention.
Figure 36:
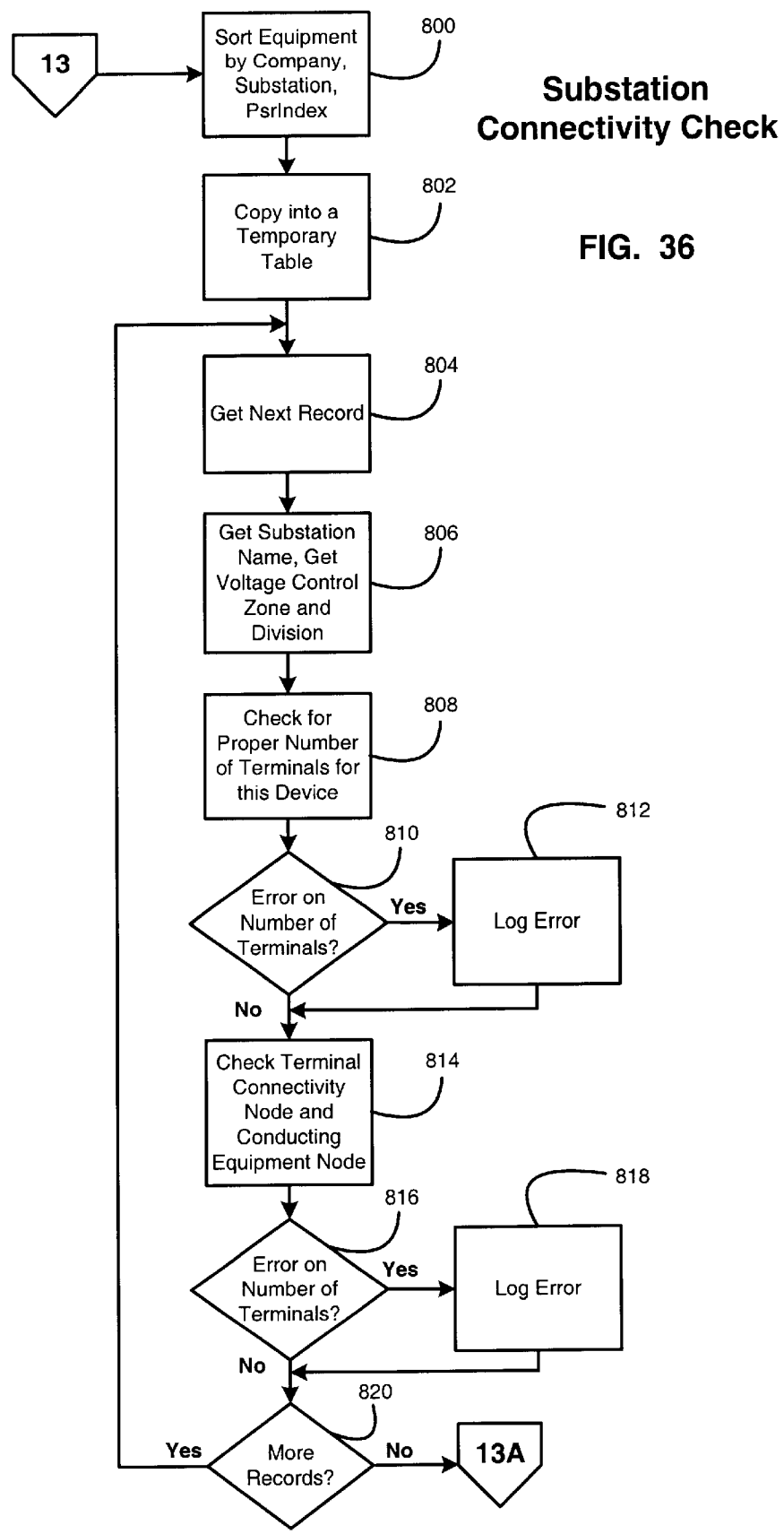
FIG. 36 is a detailed flow chart of the steps used for substation connectivity checking of the CIM power systems equipment in the preferred embodiment of the present invention.

Validating database connectivity 458 is further detailed in FIG. 35. This begins at the substation level and checking the devices follows the graphical user interface representation as shown in FIG. 26. At step 750, the check substations are further detailed on FIG. 36. The physical equipment and associated data is sorted by company, substation, and PsrIndex (power system resource index) 800. The results are copied to a temporary table 802. A record 804 is obtained that contain an elemental power systems resource. This could be an A/C line segment, breaker, bus bar section etc. as illustrated in FIG. 26. The substation name, voltage control zone and division name associated with a record 806 are retrieved for the purposes of error reporting. There are a predefined number of terminals associated with each device as illustrated in FIG. 38. The number of terminals currently associated with the current device is compared to number stored 810. Responsive to a positive result for the query 810, an error message 812 is logged that contains the equipment hierarchy from the company level down to the actual device. In the case of disconnected devices, one or more terminals will be missing due to severing the connections. The user, at the completion of the Model Merge, will handle disconnected devices using a graphical user interface. Terminal connectivity node 814 and conducting equipment node are checked for their presence. The results of accessing the nodes connectivity contents are queried 816 where positive result again results in logging the hierarchy of the device. The procedure loops in the check for more records 820 to process. Responsive to a positive result for more equipment to process, processing repeats at step 804. A negative response to the query at step 820 for more equipment to process, returning to FIG. 35 at step 752 to check connectivity for the transformers.

Transformer Connectivity Check

Figure 37:
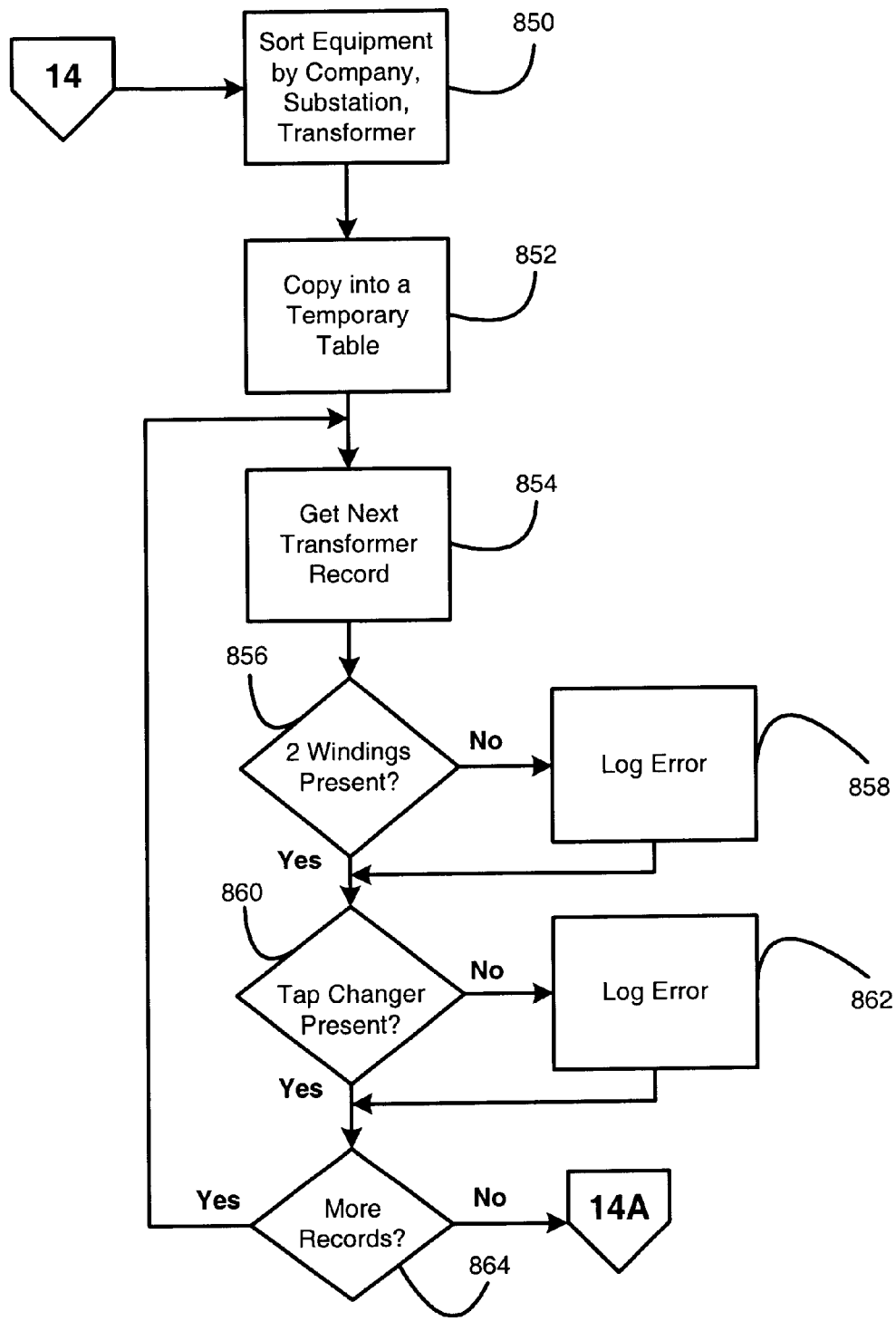
FIG. 37 is a detailed flow chart of the steps used for connectivity checking of the transformers in the preferred embodiment of the present invention.

The transformer check is further detailed in FIG. 37. The transformers are sorted by company, substation and transformer name 850. The entire list is copied into a temporary table 852. A record 854 is obtained containing the transformer specifics. A check for two transformer windings is made at step 856. A positive result to the query at step 856 results in logging an error 858 that contains the equipment hierarchy. A check for a tap changer 860 being present is made and if not present, an error 862 is logged that will contain the equipment hierarchy. A check for more records 864 present is conducted. Positively responding to the query at step 864 will repeat the process at step 854. A negative response to the query at step 864 returns to FIG. 35 at step 754 and the connectivity checking process is done.

Figure 39:
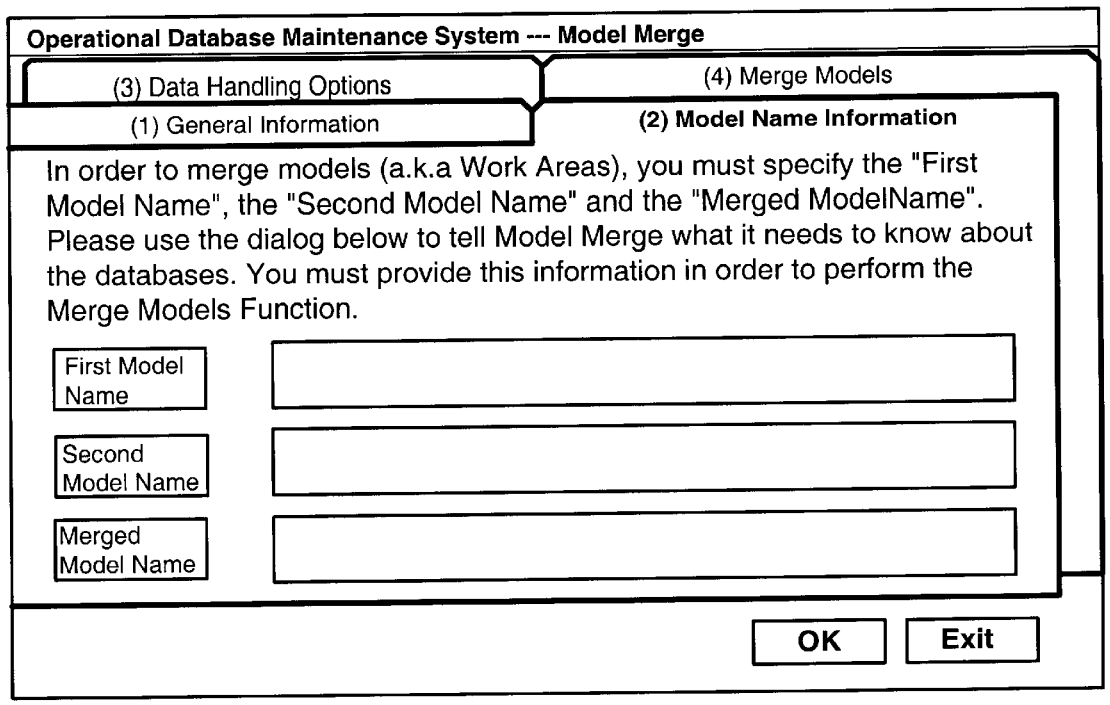
FIG. 39 is an example of the graphical user interface for CIM database integration to select the databases in the preferred embodiment of the present invention.
Figure 40:
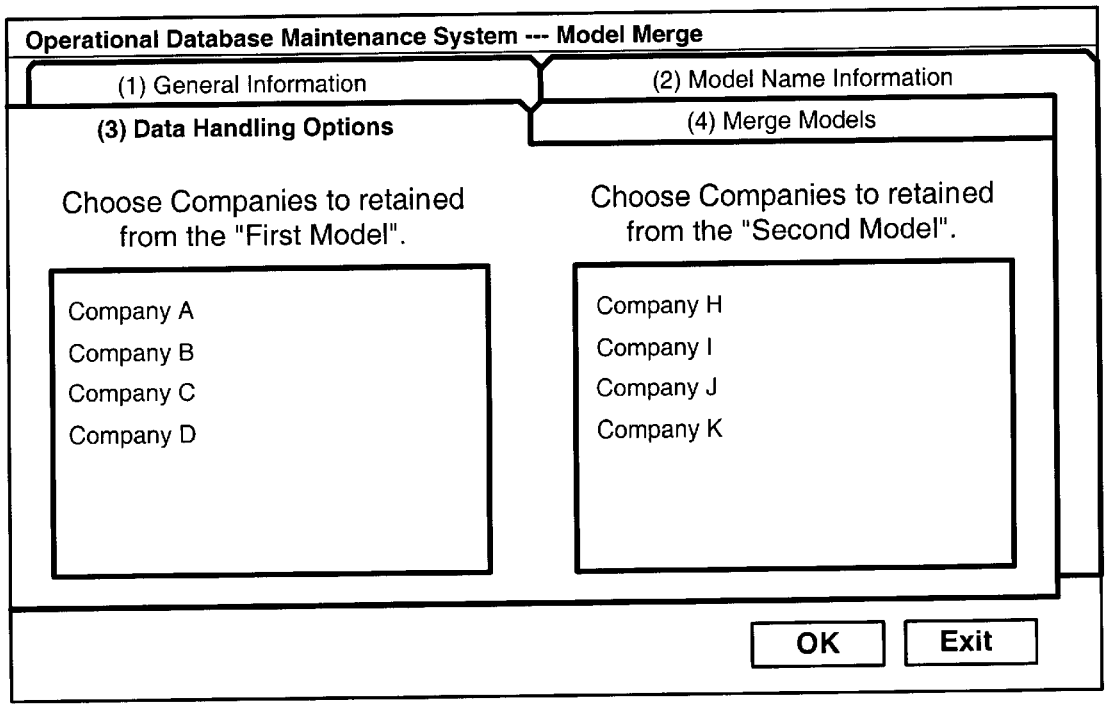
FIG. 40 is an example of the graphical user interface for CIM database integration to select companies to merge from each model in the preferred embodiment of the present invention.

The system in which the user actually performs the CIM database integration is now explained. Referring now to FIG. 39 that illustrates a graphic panel that displays database selection. The user will select the first model, second model and target database name by depressing the buttons associated with the corresponding names. A standard "open file" dialog with only database extensions assist the user in the selection process. In FIG. 40, the user selects the companies from both CIM database models that are to be included in the final database. This provides a method for the user to add the geographically surrounding areas in small increments when building the fully populated network models. Of course, all of the companies in both models can be selected.

Referring to FIG. 2 step 70 and FIG. 30 for steps 460 for connectivity error(s) being detected and to edit a power grid 462, the user resolves the disconnected devices that were detected during validate connectivity 458. More particularly, the errors logged in FIG. 36 in step 812 and step 818 and also FIG. 37 in step 858 and step 862. The user is guided to each disconnected device as shown in FIG. 41 and uses a simple drag and drop to include the devices and terminals. The corresponding equipment is located in the lower left quadrant and dragged to the upper right quadrant. Two additional levels of editing the integrated databases are available. First, the user can revert back to the initial Data Handling Options (FIG. 40) and select one or more additional companies containing the disconnected equipment and Merge Models again. Second, the graphical user interface for the Network Topology Editor (FIG. 22) can be used to add or delete specific equipment to resolve the disconnected devices.

Export Filter

Figure 42:
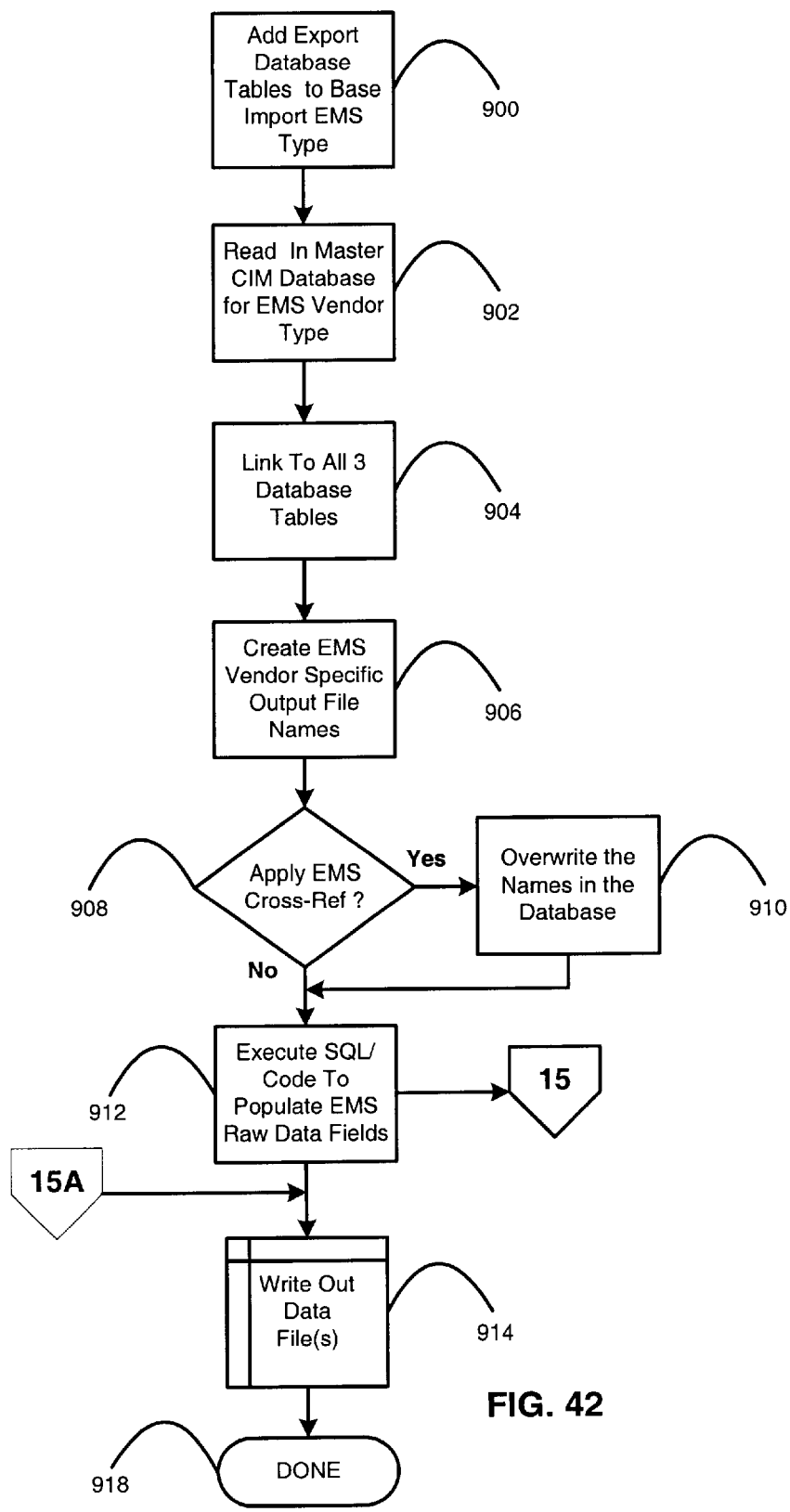
FIG. 42 is a flow chart of the programming steps of the Export process in the preferred embodiment of the present invention.
Figure 43:
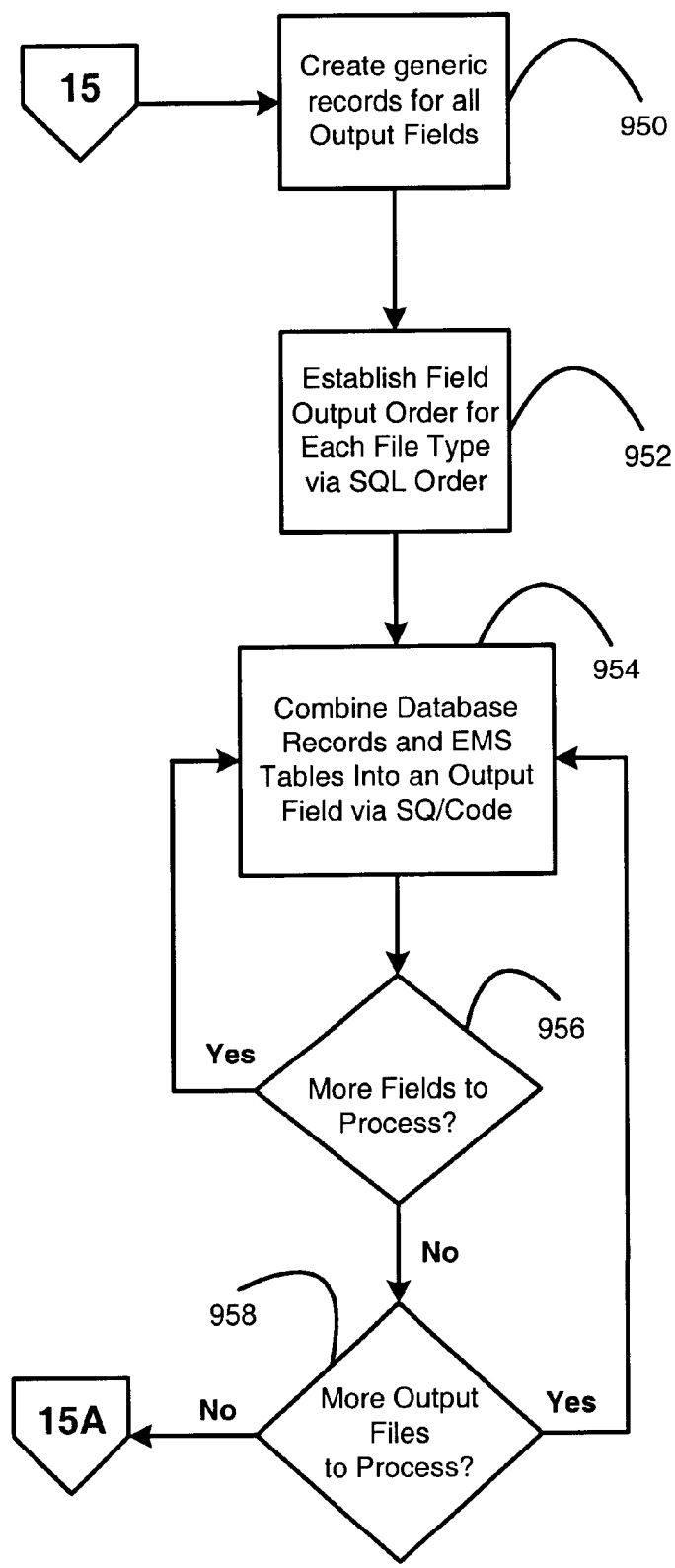
FIG. 43 is an extract of a step in the FIG. 42 flow chart of the programming steps of the Export process in the preferred embodiment of the present invention.
Figure 44:
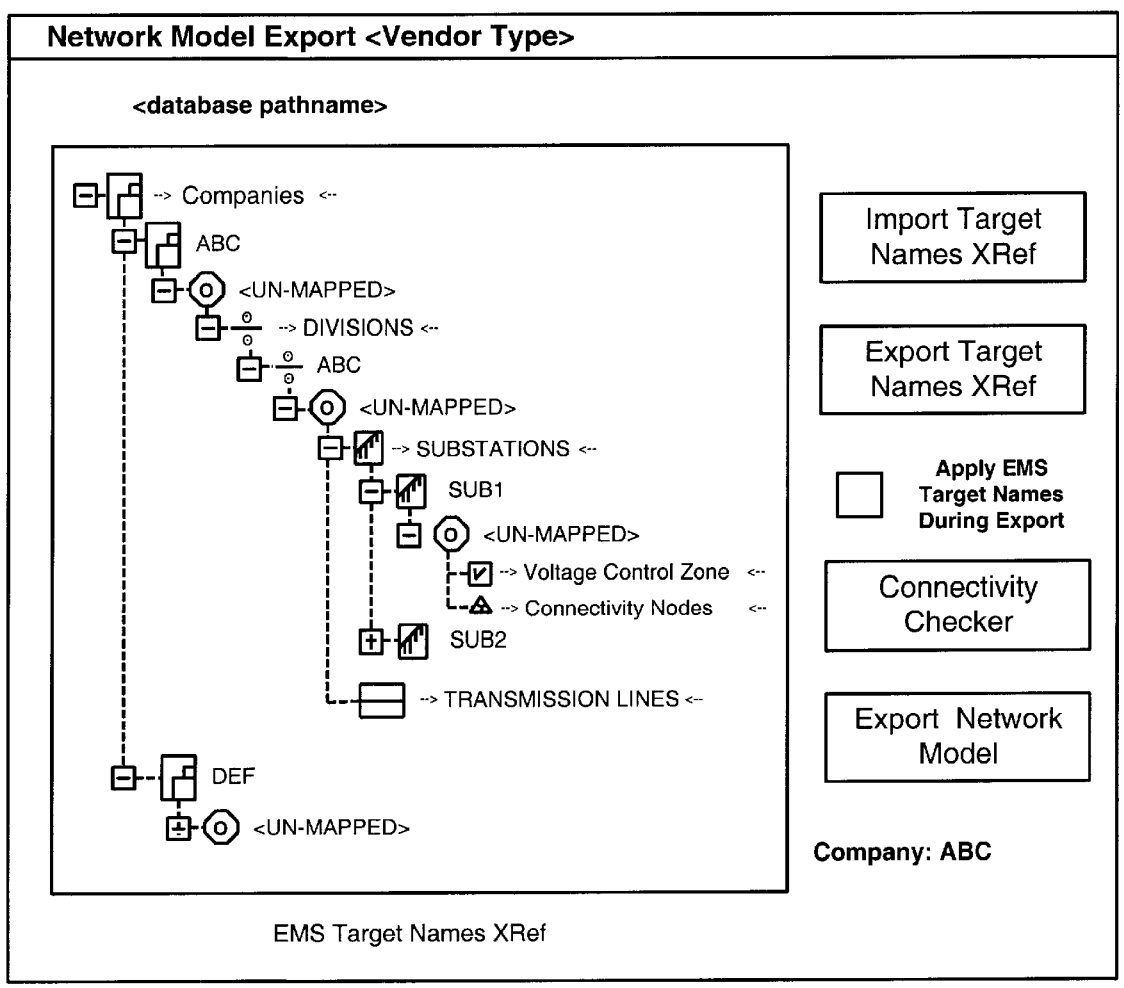
FIG. 44 is a representation of the graphical user interface of the Export process in the preferred embodiment of the present invention.

Referring now to FIG. 2 step 80 to export the database to a specific EMS data format. Raw EMS vendor specific data converted to a CIM format does little more than allow aggregate power systems models to collate into a single model. Consequently, it is necessary to convert from one EMS vendors data format to another directly from the aggregate EMS models in CIM format so that the data may be seamlessly inserted into any of the running EMS's. Referring to FIG. 42 that illustrates how to construct an Export Filter that converts the CIM data to a specific EMS data format, step 900 adds Export database tables to the to the Import EMS Base database type. These tables provide the EMS specific information that will be needed to produce raw data formats as if the data were extracted from a running EMS. Generally, the Import filter is completed before constructing the Export filter since the Base and Master database templates containing the tables are reused. Although it is not specifically illustrated how to construct only the Export Filter, one skilled in the art could easily review the Import Filter as previously described and extract the process to produce a stand alone Export Filter. For the purposes of the Export Filter construction, we will assume that the Import Filter for the specific EMS vendor data format has already been constructed. Step 902 reads into memory the Master database for the specific EMS vendor type. The Base, Master and current CIM database tables 904 are linked so that Sequential Query Language (SQL) can access the data in the tables. EMS vendor data formats vary widely in the number of files and their contents and therefore it is necessary to create the EMS specific output files names in step 906. Responsive to the query 908 to apply the EMS cross-reference being positive, overwriting the names in the database 910. Referring back to FIG. 20, the table PowerSystemResource and element PsyEMSName contains the name in the cross-reference table that will be used at export time. Note that the table is completed by the source company(s) on behalf of the target company(s) in advance of the export process. An example of the EMS Resource Cross-Reference Table in the preferred embodiment of the present invention is illustrated in FIG. 45, where the name would be stored in the PsyGUID Targetname. Executing the SQL and/or code sequences to populate database tables 912 is further detailed by creating generic records for all output fields 950. Establishing the field output order for each file type 952 matches the fields as extracted from the database tables into formatted output statements for each record type. Combining the database records and EMS tables (previously prepared CSV tables) into an output field that matches the EMS raw data 954 input specification further includes multiple stage processing for some EMS vendor data formats that alternate between executing SQL and code fragments. Executing code fragments is done when the operation cannot be done using SQL. For example, the source EMS vendor data format does not require that al A/C lines that connect two busbars have a unique name that is relative only to the two busbars. The target EMS data format requires that the A/C lines that connect have unique numbers. Given three A/C lines connecting between busbars, these must be numbered 1,2 and 3. The next substation may have two A/C lines connecting two busbars and these must be numbered 1 and 2. This operation is not possible using only SQL and therefor is processed in code fragments between processing stages. There are currently three processing stages in the preferred embodiment of the present invention to handle such cases. Positively responding to the query 956 to process additional output fields, returning to step 954 to prepare another output field. Negatively responding to the query at 956 to process additional output fields, checking for more output files 958 to be processed. Positively responding to the query 958 to process more outputifiles returns to step 954. Negatively responding to the query 958 to process more output files returns to FIG. 42 step 914 to write out the data files into permanent disk files 914 and completing an Export process 918. An example of the graphical user interface used for the Export process is illustrated in FIG. 44 in the preferred embodiment of the present invention.

What we claim is:

1. A computer implemented system and method of providing interoperability of various proprietary Energy Management System raw data formats, comprising the steps of:
    (a) means for importing proprietary Energy Management System raw data, which is extracted from a running system or simulation, containing electrical network topology, measurements and related data to produce a source Common Information Model database that is properly electrically connected;
    (b) means for recursively integrating a source and target Common Information Model databases into a new Common Information Model database that is properly electrically connected;
    (c) means for maintaining said Common Information Model database using a graphical user interface to display and edit database entries; and
    (d) means for exporting a said Common Information Model database to a specific proprietary Energy Management System raw data format contained in one or more files,
whereby an electrically connected network topology and related data can be exchanged and maintained between any proprietary Energy Management System of the same or different data format for the purpose of obtaining a complete and accurate network topology model while maintaining proprietary Energy Management System specific data format confidentiality.

2. The method of claim 1 wherein the step of importing proprietary Energy Management System raw data further comprising the steps of:
    (a) means for creating a base database template with Common Information Model column headers;
    (b) means for creating one or more comma separated values schema template(s) based on the specific proprietary Energy Management System data format;
    (c) duplicating the proprietary Energy Management System data hierarchy such that the proprietary Energy Management System specific raw data is properly inserted into the comma separated values;
    (d) means for resolving the connectivity nodes by data association or device context;
    (e) means for converting the raw proprietary Energy Management System data fields into a comma separated value file format based on the associated specification;
    (f) linking the comma separated values to a temporary work database;
    (g) means for inserting various power systems equipment into the temporary work(Base) database using an encrypted database query language and possibly code fragments during processing;
    (h) means for loading the power systems equipment into a final power systems database(Master) from the temporary work(Base)database using a database query language and possibly code fragments during processing; and
    (i) optionally verifying the electrical connectivity and providing a device level report for any error encountered.

3. The method of claim 2 wherein the step of creating a base database template with basic Common Information Model column headers further comprising the steps of:
    (a) creating the terminal types table;
    (b) creating the system type table;
    (c) creating the foreign key tables;
    (d) creating the reference convert table;
    (e) optionally creating the auxiliary types table;
    (f) optionally creating the auxiliary data table;
    (g) means for creating the temporary data templates tables; and
    (h) combining said tables into a base database template.

4. The method of claim 2 wherein the step of creating the comma separated values schema templates internally further comprising the steps of:

(a) creating an internal structure of the proprietary Energy Management System supplied data elements to be represented in a comma separated values format;

(b) matching the proprietary Energy Management System data elements to the Common Information Model objects; and (c) including the proprietary Energy Management System specific objects in the auxiliary types table, auxiliary data table or an specific table.

5. The method of claim 2 wherein the step of duplicating the proprietary Energy Management System data hierarchy internally further comprising the steps of:

(a) creating and processing a flat data hierarchy of the proprietary Energy Management System supplied data elements if the specification has flat data organization; and (b) means for creating and processing an internal table with an assigned data level to match the input file name and data element for multi-leveled proprietary Energy Management System specific raw data formats.

6. The method of claim 2 wherein the step of resolving the connectivity nodes further comprises the steps of:

(a) determining the state of the proprietary Energy Management System supplied data and documentation to be without specific connectivity nodes;

(b) means for locating the source and destination nodes from equipment specifications;

(c) means for creating the busbar connectivity nodes in the connectivity table;

(d) means for creating the connectivity nodes for al switches nodes in the connectivity table;

(e) means for creating remaining source nodes in the connectivity table;

(f) means for creating remaining destination nodes in the connectivity table; and (g) means for creating connectivity nodes for all grounds nodes in the connectivity table.

7. The method of claim 2 wherein the step of inserting various power systems equipment into the temporary work (Base) database using a database query language and possibly code fragments during processing further comprising the steps of:

(a) creating generic records for all proprietary Energy Management System specific output field definitions;

(b) means for establishing the field output order for each proprietary Energy Management System file type and setting the order of Sequential Query Language processing; and (c) means for combining the database records and the proprietary Energy Management System tables into an output field for the target record type for all records and for al files.

8. The method of claim 1 wherein the step of recursively integrating a source and target Common Information Model databases into a new Common Information Model database that is properly electrically connected comprising the steps of:

(a) a user selection of whole or partial network topology from a first and second Common Information Model database;

(b) means for integrating said first and second Common Information Model databases into a single target database;

(c) means for detecting any disconnected equipment encountered during connectivity checking said source and target combined database; and (d) means for automatically resolving disconnected equipment.

9. The method of claim 8 wherein the step of integrating said first and second Common Information Model databases into a single target database further comprising the steps of:

(a) creating a foreign key relational map of the source and target databases;

(b) removing non-selected companies from a first and second user selected database model;

(c) means for creating temporary cross-reference tables in combination with the original database;

(d) creating a temporary copy of said first and second user-selected models;

(e) means for integrating unique lookup information from said first and second user-selected models;

(f) merging al said non-static tables;

(g) means for dynamically assigning new primary keys to non-static tables during merge processing;

(h) means for processing remaining equipment contained in said master power system resource table;

(i) re-indexing of said connectivity table;

(j) copying the temporary data to said target database; and (k) means for looping on all tables in said target database to convert temporary foreign keys into their newly indexed values.

10. The method of claim 1 wherein the step of maintaining said Common Information Model database using a graphical user interface to display and edit database entries further comprises the steps of:

(a) means for a user selected company or plurality of companies and type of topological view, displaying the data in a downward tree expansion for any of the selected said views including:transmission lines, connectivity nodes, transformers and substations by base voltage;

(b) means for optionally editing existing equipment parameters to the network topology for any device and any said topological view;

(g) means for optionally adding new equipment to the network topology in any said topological view; and (h) means for optionally deleting equipment from the network topology in any said topological view.

11. The method of claim 1 wherein the step of exporting said proprietary Energy Management System raw data format from a Common Information Model database to a different vendor data format further comprising the steps of:

(a) means for creating and processing a base database template with basic Common Information Model column headers and proprietary Energy Management System specific export definitions;

(b) means for creating and processing a master database template with proprietary Energy Management System specific extensions and Common Information Model compliant tables;

(c) means for optionally applying a cross-reference of power system equipment names that replace original equipment names;

(d) means for applying an encrypted proprietary Energy Management System specific database query language and possibly code fragments to populate the associated specific raw data output fields into the native raw data file format; and (e) writing the proprietary Energy Management System specific raw data file(s) to disk or a permanent storage medium.

12. The method of claim 1 wherein the step of converting the raw proprietary Energy Management System data to a comma separated values file format further comprises the steps of:

(a) means for matching the data format in the proprietary Energy Management System file(s) and fields to the Common Information Model equivalents for al equipment;

(b) means for optionally processing a multi-level data hierarchy by parsing proprietary Energy Management System raw data based on the level; and (c) means for inserting the equipment type into the comma separated values based on the previously defined proprietary Energy Management System specific schema for all equipment types.

* * * * *